(12) United States Patent
Morinaga et al.

(10) Patent No.: US 7,957,303 B2
(45) Date of Patent: Jun. 7, 2011

(54) COMMUNICATION QUALITY EVALUATION METHOD, DERIVATION DEVICE, COMMUNICATION QUALITY EVALUATION SYSTEM AND COMPUTER PROGRAM

(75) Inventors: Masanobu Morinaga, Kawasaki (JP); Hideaki Miyazaki, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 854 days.

(21) Appl. No.: 11/819,743

(22) Filed: Jun. 28, 2007

(65) Prior Publication Data

US 2007/0253337 A1    Nov. 1, 2007

Related U.S. Application Data

(63) Continuation of application No. PCT/JP2004/019642, filed on Dec. 28, 2004.

(51) Int. Cl.
*H04L 12/26* (2006.01)
(52) U.S. Cl. ......... 370/249; 370/241; 370/248; 709/224
(58) Field of Classification Search .............. 370/241, 370/248, 249, 250, 252, 253; 709/223, 224
See application file for complete search history.

(56) References Cited

U.S. PATENT DOCUMENTS

| 5,818,815 | A | 10/1998 | Carpentier et al. | |
| 6,563,796 | B1 * | 5/2003 | Saito ............................ | 370/252 |
| 2002/0015485 | A1 * | 2/2002 | Bhusri ..................... | 379/220.01 |
| 2003/0053419 | A1 * | 3/2003 | Kanazawa et al. ........... | 370/252 |
| 2003/0081560 | A1 | 5/2003 | Honda | |
| 2003/0121053 | A1 | 6/2003 | Honda | |
| 2004/0165570 | A1 | 8/2004 | Lee | |

FOREIGN PATENT DOCUMENTS

| JP | 8-97832 | 4/1996 |
| JP | 2997607 | 10/1999 |
| JP | 11-331262 | 11/1999 |
| JP | 2001-69170 | 3/2001 |
| JP | 2001-333092 | 11/2001 |
| JP | 2003-140988 | 5/2003 |
| JP | 2003-199128 | 7/2003 |
| JP | 2003-283496 | 10/2003 |
| JP | 2004-236262 | 8/2004 |
| JP | 2004-236263 | 8/2004 |
| JP | 2006-13969 | 1/2006 |
| KR | 10-2004-0060605 | 7/2004 |

OTHER PUBLICATIONS

International Search Report of International Published Application No. PCT/JP2004/019642 (mailed Apr. 12, 2005).
Japanese Office Action issued on Feb. 22, 2011 in related Japanese Patent Application No. 2009-198793 (3 pages) (2 pages English Translation).

* cited by examiner

*Primary Examiner* — Chi H Pham
*Assistant Examiner* — Weibin Huang
(74) *Attorney, Agent, or Firm* — Staas & Halsey LLP

(57) ABSTRACT

When simulating communication using a communication network such as a VoIP network, an actual communication state is accurately simulated, and communication is simulated. The distribution of delay times of packets is transformed by a predetermined transformation method, packet transmission timings to which delay times are added, are calculated based on the transformed distribution of delay times and predetermined transmission timings, a determination is made as to whether or not the packet transmission order is changed by the calculated transmission timings to which delay times are added, and, when a determination is made that the packet transmission order is changed, packet transmission timings adjusted so as not to cause a change in the transmission order are derived.

29 Claims, 19 Drawing Sheets

FIG. 3

| ITEM | SUPPLEMENTARY ITEM | SET VALUE |
|---|---|---|
| LOSS RATE | — | 3.1% |
| FIXED DELAY | — | 20ms |
| VARYING DELAY | 0ms | 65.0% |
| | 30ms | 15.0% |
| | 60ms | 10.0% |
| | 90ms | 5.0% |
| | 120ms | 2.0% |
| | 150ms | 2.0% |
| | 180ms | 1.0% |

FIG. 4

| INDEX | SCHEDULED TRANSMISSION TIME (hh:mm:ss.ms) | PACKET DATA |
|---|---|---|
| 1 | 10:00:00.000 | RTP DATA 1 |
| 2 | 10:00:00.020 | RTP DATA 2 |
| 3 | 10:00:00.041 | RTP DATA 3 |
| 4 | 10:00:00.065 | RTP DATA 4 |
| ⋮ | ⋮ | ⋮ |
| m | | |

F I G. 11

| CHARACTERISTIC OF COMMUNICATION TERMINAL DEVICE (SENDING END) | CHARACTERISTIC OF COMMUNICATION NETWORK | CHARACTERISTIC OF COMMUNICATION TERMINAL DEVICE (RECEIVING END) | EVALUATION RESULT |
|---|---|---|---|
| AAA | CHARACTERISTIC 1 | AAA | 98 |
| AAA | CHARACTERISTIC 2 | AAA | 95 |
| AAA | CHARACTERISTIC 3 | BBB | 90 |
| AAA | CHARACTERISTIC 4 | BBB | 89 |
| BBB | CHARACTERISTIC 5 | BBB | 75 |
| BBB | CHARACTERISTIC 6 | BBB | 73 |
| BBB | CHARACTERISTIC 7 | CCC | 80 |
| BBB | CHARACTERISTIC 8 | CCC | 81 |
| BBB | CHARACTERISTIC 9 | CCC | 79 |
| CCC | CHARACTERISTIC 10 | CCC | 62 |
| ... | ... | ... | ... |

FIG. 12

| ITEM | DATA |
|---|---|
| DEVICE NAME | IP-Phone-AAA |
| CODEC TYPE | g.711 |
| FRAME SIZE | 20ms |
| BUFFER LENGTH | 40ms |
| PLC | NONE |

FIG. 13

| ITEM | SUPPLEMENTARY ITEM | SET VALUE |
|---|---|---|
| MEASUREMENT START TIME | — | 10:15 |
| MEASURING TIME | — | 5min |
| R VALUE | — | 61 |
| LOSS RATE | — | 1.1% |
| FIXED DELAY | — | 20ms |
| VARYING DELAY | 0ms | 65.0% |
| | 30ms | 15.0% |
| | 60ms | 10.0% |
| | 90ms | 5.0% |
| | 120ms | 2.0% |
| | 150ms | 2.0% |
| | 180ms | 1.0% |

FIG. 15

| ITEM | SUPPLEMENTARY ITEM | SET VALUE |
|---|---|---|
| MEASUREMENT START TIME | — | 10:15 |
| MEASURING TIME | — | 5min |
| R VALUE | — | 61 |
| LOSS RATE | — | 1.1% |
| FIXED DELAY | — | 52ms |
| VARYING DELAY | 0ms | 61.0% |
| | 30ms | 14.0% |
| | 60ms | 7.0% |
| | 90ms | 8.0% |
| | 120ms | 2.0% |
| | 150ms | 2.0% |
| | 180ms | 1.0% |

F I G. 16

(a)

| ITEM | SUPPLE-MENTARY ITEM | SET VALUE |
|---|---|---|
| MEASUREMENT START TIME | — | — |
| MEASURING TIME | — | — |
| R VALUE | — | — |
| LOSS RATE | — | 0.1% |
| FIXED DELAY | — | 50ms |
| VARYING DELAY | 0ms | 95.0% |
| | 30ms | 3.0% |
| | 60ms | 2.0% |
| | 90ms | 0.0% |
| | 120ms | 0.0% |
| | 150ms | 0.0% |
| | 180ms | 0.0% |

(b)

| ITEM | SUPPLE-MENTARY ITEM | SET VALUE |
|---|---|---|
| MEASUREMENT START TIME | — | — |
| MEASURING TIME | — | — |
| R VALUE | — | — |
| LOSS RATE | — | 1.0% |
| FIXED DELAY | — | 52ms |
| VARYING DELAY | 0ms | 62.0% |
| | 30ms | 13.0% |
| | 60ms | 8.0% |
| | 90ms | 7.0% |
| | 120ms | 2.0% |
| | 150ms | 2.0% |
| | 180ms | 1.0% |

(c)

| ITEM | SUPPLE-MENTARY ITEM | SET VALUE |
|---|---|---|
| MEASUREMENT START TIME | — | — |
| MEASURING TIME | — | — |
| R VALUE | — | — |
| LOSS RATE | — | 2.1% |
| FIXED DELAY | — | 70ms |
| VARYING DELAY | 0ms | 50.0% |
| | 30ms | 30.0% |
| | 60ms | 10.0% |
| | 90ms | 10.0% |
| | 120ms | 0.0% |
| | 150ms | 0.0% |
| | 180ms | 0.0% |

COMMUNICATION QUALITY EVALUATION METHOD, DERIVATION DEVICE, COMMUNICATION QUALITY EVALUATION SYSTEM AND COMPUTER PROGRAM

CROSS REFERENCE TO RELATED APPLICATION

This application is a continuation of PCT International Application No. PCT/JP2004/019642 which has an International filing date of Dec. 28, 2004 and designated the United States of America.

TECHNICAL FIELD

The present invention relates to a communication quality evaluation method required for evaluating communication quality, a derivation device adopting the communication quality evaluation method, a communication quality evaluation system using the derivation device, and a computer program for realizing the derivation device, and more particularly relates to a communication quality evaluation method, a derivation device, a communication quality evaluation system and a computer program for use in simulating a communication state of real-time communication of IP phones, etc.

BACKGROUND ART

In recent years, there is an increasing use of real-time applications, such as VoIP (Voice over Internet Protocol), VoPN (Voice over Packet Network), and streaming distribution, which perform transmission and reception of voice and image data between devices through communication networks such as an IP network. When a real-time application is used, the reproduction quality in reproducing voice and image data received on the application is influenced by the state of the IP network. Therefore, a guideline determined by the Ministry of Internal Affairs and Communications defines that providers of IP phone services should maintain certain communication quality for their services.

However, since a VoIP network including a plurality of communication networks such as an IP network and a public network, which provides IP phone services, is generally built in a multi-vender environment, it is difficult to secure and evaluate the transmission quality over the VoIP network. It is therefore necessary to provide an evaluation method for predicting communication quality between communicating terminal devices making a call, namely end-to-end communication quality, by simulating the characteristics of the communication network as the communication state over the VoIP network, and actually making a call between the terminal devices.

In a currently used evaluation method, since the characteristics of the communication network, such as the packet loss rate and delay on the communication network, are expressed as an average value, a maximum value, a minimum value, a standard deviation, or variance, etc., there is not sufficient information to simulate the characteristics of the communication network. In particular, there is a problem that it is not possible to accurately simulate a communication state including a change in the delay time of each packet and changes in the communication network characteristics such as burst performance with time, which is important to evaluate the communication quality of a VoIP call.

Then, for example, Patent Document 1 proposes a method for simulating a communication state including a change in the delay time of packets and burst performance. FIG. 17 is an explanatory view schematically showing the delay in the arrival time of packets. FIG. 17 schematically illustrates the results of measuring the communication state of packets as an explanatory view showing the relation between an expected arrival time and an actual arrival time. On the upper side of FIG. 17, the expected arrival times of the respective packets are illustrated in a time series so that time passes from left to right, and it is shown by five rectangles that packets assigned with the transmission order of the first to fifth are expected to arrive at transmission intervals d. On the lower side of FIG. 17, the actually measured arrival times of the respective packets are illustrated. As shown in FIG. 17, a packet transmitted first arrived with a delay time of $0d$ or as expected, but a packet transmitted second has a delay time of $3d$. Similarly, packets transmitted third, fourth and fifth have delay times of $2d$, $1d$, and $1d$, respectively. Specifically, in the VoIP network shown in FIG. 17, since one delay time $0d$, two delay times $1d$, one delay time $2d$ and one delay time 3 were measured, it is considered that the delay times $0d$, $1d$, $2d$ and $3d$ are distributed by 20%, 40%, 20%, and 20%, respectively.

FIG. 18 is an explanatory view showing schematically the results of conducting simulation tests about the communication state of a VoIP network, based on the measurement results of FIG. 17. The upper side of FIG. 18 shows times at which packets are to be transmitted from a transmission terminal device that transmits packets in a time series, and indicates by five rectangles that the transmission at transmission intervals d is set as the original transmission timings for the first to fifth packets in the transmission order. The lower side of FIG. 18 shows the results of simulating a VoIP network by adding delay times based on the measurement results shown in FIG. 17. As shown in FIG. 18, the delay time $1d$ is added to a packet to be transmitted first, and the delay times $2d$, $3d$, $0d$, and $2d$ are added to packets to be transmitted second, third, fourth and fifth, respectively. As clear from FIG. 18, although a distribution of delay times is simulated, there is a reversal of transmission timing between the second packet and the third packet and also between the fourth packet and the fifth packet, and thus it is hard to say that an actual communication state is simulated.

FIG. 19 is an explanatory view showing schematically the results of conducting simulation tests about the communication state of the VoIP network, based on the measurement results of FIG. 17. The upper side of FIG. 19 shows times at which packets are to be transmitted from the transmission terminal device that transmits packets in a time series, and indicates by five rectangles that the transmission at transmission intervals d is set as the original transmission timings for the first to fifth packets in the transmission order. The lower side of FIG. 19 shows the results of adjusting the transmission timings to avoid the reversal of transmission timing, based on the results shown in FIG. 18. Specifically, when the transmission timing of the (n+1)th packet comes earlier than the transmission timing of the nth packet, an adjustment is made so that the (n+1)th packet is transmitted immediately after the nth packet. In the example shown in FIG. 19, the transmission timing of the third packet which comes earlier than the transmission of the second packet is adjusted, and the transmission timing of the fifth packet which comes earlier than the transmission timing of the fourth packet is adjusted. In this manner, a reversal of transmission timing is avoided. However, in the finally observed delay times, the delay time $1d$ was added to the packet to be transmitted first, and the delay times $3d$, $2d$, $2d$, and $1d$ were added to the packets to be transmitted second, third, fourth, and fifth, respectively. This result shows a distribution different from the distribution of delay times representing the measurement results of FIG. 17, and it is also hard to say in this case that an actual communication state is simulated.

[Patent Document 1] Japanese Patent No. 2997607

DISCLOSURE OF THE INVENTION

However, in a conventional method that simulates a communication state, when transmission timings are determined based on the distribution of delay times as shown in FIG. 18, there is a problem that a reversal of transmission timings occurs, and a state different from the actual communication state is produced. Moreover, when the transmission timings are adjusted to prevent the reversal of transmission timings as shown in FIG. 19, the distribution of delay times in a state different from the actual communication state is produced, and thus there is a problem of failing to simulate the actual communication state.

Further, although a communication state which most needs a simulation test is a state in which the communication state, including the packet loss rate and delay, over a communication network is the worst, the conventional method has a problem that it does not take this fact into account.

Even when a VoIP network is constructed using newly developed terminal devices and communication network, or even when a VoIP network is constructed using general terminal devices and communication network, a similar amount of work is required for simulation tests, and therefore, when general terminal devices and communication network are used, there is a problem that the simulation tests are inefficient.

The present invention has been made to solve the above problems, and it is an object of the invention to provide a communication quality evaluation method capable of deriving transmission timings simulating actual communication network characteristics by calculating and adjusting transmission timings to which delay times are added, after transforming the distribution of delay times by a predetermined transformation method; a derivation device adopting the communication quality evaluation method; a communication quality evaluation system using the derivation device; and a computer program for realizing the derivation device.

It is another object of the invention to provide a communication quality evaluation method and so on capable of conducting a simulation test in a state that may cause the biggest problem in practical use by specifying and simulating a communication state having the poorest communication state among communication states measured under different conditions.

A further object of the invention is to provide a communication quality evaluation method and so on capable of evaluating communication quality efficiently for a general communication condition by recording a communication condition such as the characteristic of the terminal device and communication network in association with an evaluation result of communication quality in advance.

A communication quality evaluation method according to a first aspect is a communication quality evaluation method for executing a process required for evaluating communication quality by using a derivation device for deriving communication states of a plurality of packets which are to be transmitted successively at predetermined transmission timings, and characterized in that the derivation device transforms a prerecorded distribution of delay times at arrival of transmitted packets by a predetermined transformation method; and calculates packet transmission timings to which delay times are added, based on the transformed distribution of delay times and the predetermined transmission timings.

In the communication quality evaluation method of the present invention, it is possible to reproduce an arbitrary distribution of delay times by calculating packet transmission timings after transforming the distribution of delay times by a predetermined transformation method.

A communication quality evaluation method according to a second aspect is a communication quality evaluation method for executing a process required for evaluating communication quality by using a derivation device for deriving communication states of a plurality of packets which are to be transmitted successively at predetermined transmission timings, and characterized in that the derivation device transforms a prerecorded distribution of delay times at arrival of transmitted packets by a predetermined transformation method; calculates packet transmission timings to which delay times are added, based on the transformed distribution of delay times and the predetermined transmission timings; determines whether or not a packet transmission order is changed by the calculated transmission timings to which delay times are added; and derives packet transmission timings adjusted so as not to cause a change in the transmission order when a determination is made that the packet transmission order is changed.

In the communication quality evaluation method of the present invention, since transmission timings of the respective packets used for evaluating communication quality are derived by calculating and adjusting transmission timings of the packets after transforming the distribution of delay times by a predetermined transformation method, the transmission timings of the packets are not determined to be in a different transmission order from the original transmission order, and the distribution of delay times will be a distribution to be simulated, and therefore it is possible to derive transmission timings simulating an actual communication state. It is thus possible to accurately evaluate the communication quality.

A communication quality evaluation method according to a third aspect is a communication quality evaluation method for executing a process required for evaluating communication quality by using a derivation device for deriving communication states of a plurality of packets which are to be transmitted successively at predetermined transmission timings, and characterized in that the derivation device obtains each of communication states measured under different conditions; specifies a communication state of poorest communication quality among the obtained communication states; and records a distribution of delay times in the specified communication state.

In the communication quality evaluation method of the present invention, since the poorest communication state is recorded, it is possible to conduct a simulation test in a state that may cause the biggest problem in practical use. It is thus possible to evaluate the communication quality which may cause problems in practical use.

A communication quality evaluation method according to a fourth aspect is a communication quality evaluation method for executing a process required for evaluating communication quality by using a derivation device for deriving communication states of a plurality of packets which are to be transmitted successively, and characterized in that the derivation device receives an input of a communication condition, and extracts an evaluation result of communication quality corresponding to a communication condition identical or approximate to the received communication condition, based on a prerecorded relation between a communication condition and an evaluation result of communication quality corresponding to the communication condition.

In the communication quality evaluation method of the present invention, by extracting an evaluation result of communication quality based on the prerecorded relation between communication condition and evaluation result, it is possible to efficiently evaluate the communication quality without actually conducting simulation tests for a general communication condition.

A derivation device according to a fifth aspect is a derivation device for deriving communication states of a plurality of packets which are to be transmitted successively at predetermined transmission timings, and characterized by comprising: a delay time database recording a distribution of delay times at arrival of transmitted packets; means for reading the distribution of delay times recorded in the delay time database; means for transforming the read distribution of delay times by a predetermined transformation method; and means for calculating packet transmission timings to which delay times are added, based on the transformed distribution of delay times and the predetermined transmission timings.

In the derivation device of the present invention, it is possible to reproduce an arbitrary distribution of delay times by calculating packet transmission timings after transforming the distribution of delay times by a predetermined transformation method.

A derivation device according to a sixth aspect is a derivation device for deriving communication states of a plurality of packets which are to be transmitted successively at predetermined transmission timings, and characterized by comprising: a delay time database recording a distribution of delay times at arrival of transmitted packets; means for reading the distribution of delay times recorded in the delay time database; means for transforming the read distribution of delay times by a predetermined transformation method; means for calculating packet transmission timings to which delay times are added, based on the transformed distribution of delay times and the predetermined transmission timings; means for determining whether or not a packet transmission order is changed by the calculated transmission timings to which delay times are added; and deriving means for deriving packet transmission timings adjusted so as not to determine the transmission order when a determination is made that the packet transmission order is changed.

In the derivation device of the present invention, by deriving transmission timings of the respective packets for use in evaluating communication quality by calculating and adjusting the transmission timings after transforming the distribution of delay times by a predetermined transformation method, the transmission timings of the packets are not determined to be in a different transmission order from the original transmission order, and the distribution of delay times will be a distribution to be simulated, and thus it is possible to derive transmission timings simulating an actual communication state.

A derivation device according to a seventh aspect is based on the sixth aspect, and characterized in that the predetermined transformation method transforms the distribution of delay times based on the transmission timings derived by the deriving means so that it becomes identical to the distribution of delay times recorded in the delay time database.

In the derivation device of the present invention, it is possible to derive transmission timings simulating an actual communication state by making the derived distribution of delay times identical to the original distribution of delay times recorded in the delay time database.

A derivation device according to an eighth aspect is based on the sixth aspect or seventh aspect, and characterized in that the deriving means is constructed to adjust the transmission timings of packets whose transmission order based on the transmission timings to which delay times are added, is different from an original transmission order.

In the derivation device of the present invention, it is possible to derive transmission timings simulating an actual communication state without causing a reversal in the transmission order.

A derivation device according to a ninth aspect is based on any one of the fifth aspect through eighth aspect, and characterized in that the delay time database records the delay times at arrival of transmitted packets and occurrence rates of the delay times in association with each other as a distribution of delay times, and the predetermined transformation method is a transformation method for transforming the occurrence rates of delay times.

In the derivation device of the present invention, it is possible to readily express the distribution of delay times.

A derivation device according to a tenth aspect is based on any one of the fifth aspect through ninth aspect, and characterized in that the delay time database records a loss rate at arrival of transmitted packets, and characterized by further comprising: means for reading the loss rate recorded in the delay time database; and means for discarding a packet to be transmitted, based on the read loss rate.

In the derivation device of the present invention, it is possible to simulate an actual communication state by additionally taking the packet loss rate into consideration.

A derivation device according to an eleventh aspect is based on any one of the fifth aspect through tenth aspect, and characterized by further comprising: means for obtaining each of communication states measured under different conditions; specifying means for specifying a communication state of poorest communication quality among the obtained communication states; and means for recording a distribution of delay times of the transmitted packets in the specified communication state in the delay time database.

In the derivation device of the present invention, it is possible to conduct a simulation test in a state that may cause the biggest problem in practical use by recording the poorest communication state.

A derivation device according to a twelfth aspect is based on the eleventh aspect, and characterized in that the different conditions are times at which measurement is performed, and the specifying means is constructed to specify the poorest communication state, based on at least one of a R value, a packet loss rate, and a delay state indicating communication quality.

In the derivation device of the present invention, by determining the poorness for each time, based on an element having great influence on the communication quality, it is possible to conduct a simulation test in a state that may cause the biggest problem in practical use.

A derivation device according to a thirteenth aspect is based on any one of the fifth aspect through twelfth aspect, and characterized by further comprising: an evaluation result database recording a communication condition and an evaluation result of communication quality in association with each other; means for receiving an input of a communication condition; and means for extracting, from the evaluation result database, an evaluation result of communication quality associated with a communication condition identical or approximate to the received communication condition.

In the derivation device of the present invention, by extracting an evaluation result of communication quality based on the prerecorded relation between communication condition and evaluation result, it is possible to efficiently evaluate the communication quality without actually conducting simulation tests for a general communication condition.

A derivation device according to a fourteenth aspect is based on the thirteenth aspect, and characterized in that the communication condition is a characteristic of a device and a characteristic of a communication network used for communications.

In the derivation device of the present invention, it is possible to efficiently evaluate the communication quality, according to the characteristic of actually used device and communication network.

A derivation device according to a fifteenth aspect is a derivation device for deriving communication states of a plurality of packets which are to be transmitted successively, and characterized by comprising: an evaluation result database recording a communication condition and an evaluation result of communication quality in association with each other; means for receiving an input of a communication condition; and means for extracting, from the evaluation result database, an evaluation result of communication quality associated with a communication condition identical or approximate to the received communication condition as a communication state.

In the derivation device of the present invention, by extracting an evaluation result of communication quality based on the prerecorded relation between communication condition and evaluation result, it is possible to efficiently evaluate the communication quality without actually conducting simulation tests for a general communication condition.

A communication quality evaluation system according to a sixteenth aspect is characterized by comprising a derivation device as set forth in any one of the fifth aspect through fourteenth aspect, and a communication terminal device for communicating with the derivation device, wherein the derivation device comprises means for transmitting packets to the communication terminal device, based on transmission timings.

In the communication quality evaluation system of the present invention, by receiving packets transmitted from the derivation device at the communication terminal device, it is possible to simulate a state in which the system is applied to an actual VoIP network, and it is possible to evaluate the communication quality.

In a communication quality evaluation system according to a seventeenth aspect is based on the sixteenth aspect, and characterized in that the packets contain voice data.

In the communication quality evaluation system of the present invention, by using voice data, it is possible to simulate a communication state, particularly how voice is heard, when an IP phone is used as the communication terminal device.

A computer program according to an eighteenth aspect is a computer program for causing a computer to derive communication states of a plurality of packets which are to be transmitted successively at predetermined transmission timings, and characterized by causing a computer to execute a step of reading a distribution of delay times from a delay time database recording the distribution of delay times at arrival of transmitted packets; a step of transforming the read distribution of delay times by a predetermined transformation method; and a step of calculating packet transmission timings to which delay times are added, based on the transformed distribution of delay times and the predetermined transmission timings.

With the computer program of the present invention, by calculating transmission timings of packets after transforming the distribution of delay times by a predetermined transformation method, it is possible to reproduce an arbitrary distribution of delay times.

A computer program according to a nineteenth aspect is a computer program for causing a computer to derive communication states of a plurality of packets which are to be transmitted successively at predetermined transmission timings, and characterized by causing a computer to execute a step of reading a distribution of delay times from a delay time database recording the distribution of delay times at arrival of transmitted packets; a step of transforming the read distribution of delay times by a predetermined transformation method; a step of calculating packet transmission timings to which delay times are added, based on the transformed distribution of delay times and the predetermined transmission timings; a step of determining whether or not a packet transmission order is changed by the calculated transmission timings to which delay times are added; and a step of deriving packet transmission timings adjusted so as not to cause a change in the transmission order when a determination is made that the packet transmission order is changed.

By executing the computer program of the present invention with a communication computer, the computer operates as the derivation device, and derives the transmission timings of the respective packets for use in evaluating communication quality by calculating and adjusting the transmission timings after transforming the distribution of delay times by a predetermined transformation method, and thus it is possible to derive transmission timings simulating an actual communication state because the transmission timings of the packets are not determined to be in a different transmission order from the original transmission order, and the distribution of delay times will be a distribution to be simulated.

A computer program according to a twentieth aspect is based on the nineteenth aspect, and characterized by causing a computer to execute a step of obtaining each of communication states measured under different conditions; a step of specifying a communication state of poorest communication quality among the obtained communication states; and a step of recording a distribution of delay times of the transmitted packets in the specified communication state in the delay time database.

With the computer program of the present invention, by recording the poorest communication state, it is possible to conduct a simulation test in a state that may cause the biggest problems in practical use. It is thus possible to evaluate communication quality which may cause problems in practical use.

A computer program according to a twenty first aspect is a computer program for causing a computer to derive communication states of a plurality of packets which are to be transmitted successively, and characterized by causing, upon receipt of an input of a communication condition, a computer to execute a step of extracting an evaluation result of communication quality associated with a communication condition identical or approximate to the received communication condition as a communication state from an evaluation result database recording a communication condition and an evaluation result of communication quality in association with each other.

By executing the computer program of the present invention with a communication computer, the computer operates as the derivation device, and extracts an evaluation result of communication quality based on the prerecorded relation between communication condition and evaluation result, and therefore it is possible to efficiently evaluate communication quality without actually conducting simulation tests for a general communication condition.

According to the communication quality evaluation method, derivation device, communication quality evaluation system, and computer program of the present invention, for example, the distribution of delay times which were actually measured at arrival of packets is transformed by a predetermined transformation method, and packet transmission timings to which delay times are added, are calculated based on the transformed distribution of delay times and predetermined transmission timings.

In this structure, it is possible to reproduce a distribution of delay times at the arrival of packets similar to an actually measured communication state, and thereby providing advantageous effects, such as making it possible to confirm a voice reproduction state when an IP phone is connected to a network in a state closer to an actual communication state.

According to the communication quality evaluation method, derivation device, communication quality evaluation system, and computer program of the present invention, for example, the distribution of actually measured delay times at the time of arrival of packets is transformed by a predetermined transformation method, packet transmission timings to which delay times are added, are calculated based on the transformed distribution of delay times and predetermined transmission timings, a determination is made as to whether or not the packet transmission order is changed by the calculated transmission timings to which delay times are added, and, when a determination is made that the packet transmission order is changed, the transmission timings to which delay times are added, are adjusted to prevent a change in the transmission order by adjusting the transmission timings of packets whose transmission order is after one packet whose transmission order based on the transmission timing to which the delay time are added, comes after its original transmission order.

In this structure, since a reversal in the transmission order will never happen, it is possible to provide advantageous effects, such as making it possible to derive transmission timings simulating an actual communication state. In particular, since a transformation method which transforms the distribution of delay times is an expression for transforming the distribution of delay times based on the transmission timings derived by adjusting delay times so that it becomes identical to the distribution of delay times before transformed, it is possible to reproduce the actual distribution of delay times, and thus it is possible to provide advantageous effects, such as making it possible to accurately simulating a communication state including a change of delay time of each packet and changes in the characteristics of a communication network, such as burst performance, with time, which is important for the evaluation of communication quality of a VoIP call. Moreover, by transmitting voice data based on the derived transmission timings from the derivation device to a communication terminal device such as an IP phone by a communication method such as streaming communication, it is possible to reproduce a communication state when the method is applied to an actual communication system such as an IP phone, and thus it is possible to provide advantageous effects, such as making it possible to apply the method to the evaluation of communication quality, based on the sense of a subject, such as a Mean Opinion Score.

Moreover, in the present invention, a communication state having poorest communication quality, such as R value, packet loss rate and delay state, among a plurality of communication states measured by changing measuring conditions such as time, is specified, and packet transmission timings are derived based on the distribution of delay times in the specified communication state.

In this structure, it is possible to provide advantageous effects, such as making it possible to reproduce a communication state having the biggest problem in practical use and evaluate the communication quality.

Further, in the present invention, since a communication condition, such as the characteristics of devices and the characteristics of a communication network for use in communications, and an evaluation result of communication quality are recorded in association with each other in advance, and when an input of a communication condition is received, an evaluation result of communication quality associated with communication condition identical or approximate to received communication condition is extracted, and therefore it is possible to provide advantageous effects, such as making it possible to efficiently evaluate the communication quality without actually conducting simulation tests for a general communication condition.

BRIEF DESCRIPTION OF THE DRAWINGS

FIG. 3 is a table conceptually showing an example of recorded contents in a delay time database included in a derivation device of Embodiment 1 of the present invention;

FIG. 4 is a table conceptually showing an example of the recorded contents of packets accumulated in accumulating means of the derivation device of Embodiment 1 of the present invention;

FIG. 11 is a conceptual view showing an example of recorded contents in an evaluation result database included in a derivation device of Embodiment 2 of the present invention;

FIG. 12 is a table conceptually showing an example of the contents of characteristics of a communication terminal device recorded in the evaluation result database included in the derivation device of Embodiment 2 of the present invention;

FIG. 13 is a table conceptually showing an example of the contents of characteristics of a communication network recorded in the evaluation result database included in the derivation device of Embodiment 2 of the present invention;

FIG. 15 is a table conceptually showing an example of characteristics of a communication network in the communication quality evaluation system of Embodiment 2 of the present invention;

FIGS. 16(a), 16(b) and 16(c) are tables conceptually showing examples of characteristics of a communication network in the communication quality evaluation system of Embodiment 2 of the present invention;

EXPLANATION OF CODES

1 Derivation device
2 Communication terminal device
100 Communication line
201, 202 Computer program
301, 302 Recording medium

BEST MODE FOR CARRYING OUT THE INVENTION

The following description will explain the present invention in detail based on the drawings illustrating some embodiments thereof. In a communication quality evaluation system of the present invention, first, the characteristics of a communication network, that is, an end-to-end communication state, including packet delay, loss rate and jitter between terminal devices, in an existing communication network, such as a VoIP network, are measured using, for example, a communication characteristic measurement method disclosed, for example, in Japanese Patent Application No. 2004-188922 filed by the applicant of this application. Then, based on the measurement results, a communication state of the existing communication network or a newly designed communication network is simulated as a simulated network for use in an IP telephony network, for example. Communication quality is evaluated using a method such as a Mean Opinion Score by asking subjects to sense simulated IP phone calls. Note that it may be possible to evaluate communication quality by other method such as a method using an existing measurement device.

Embodiment 1

Figure 1:
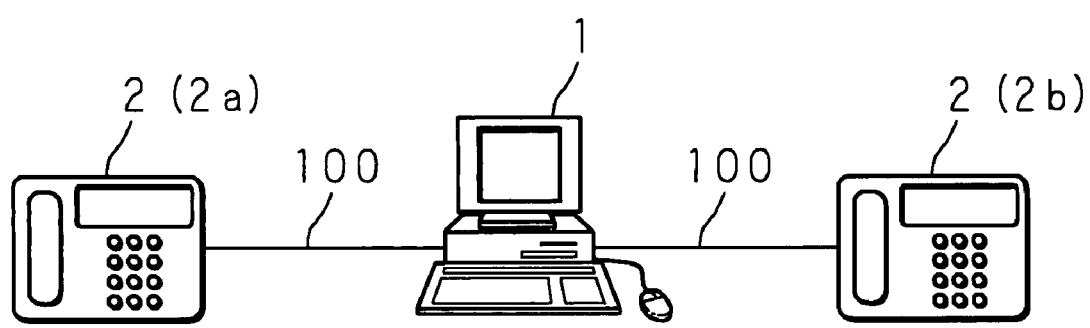
FIG. 1 is a conceptual view showing an example of a communication quality evaluation system of Embodiment 1 of the present invention.

FIG. 1 is a conceptual view showing an example of a communication quality evaluation system of Embodiment 1 of the present invention. In FIG. 1, 1 is a derivation device of the present invention using a communication computer, and, when carrying out a communication quality evaluation method of the present invention, the derivation device 1 performs various processes, such as derivation of transmission timings of packets and transmission of packets based on the derived transmission timings, to reproduce delay of the packets over a communication network to be evaluated. Two communication terminal devices 2, 2 using IP phones are connected to the derivation device 1 through communication lines 100, 100 used as a simulated network. One of the two communication terminal devices 2, 2 is used as a communication terminal device 2 on the sending end, and the other is used as a communication terminal device 2 on the receiving end. If it is necessary to particularly distinguish the respective communication terminal devices 2, they are distinguished from each other by indicating the communication terminal device 2 on the sending end as a first communication terminal device 2a, and the communication terminal device 2 on the receiving end as a second communication terminal device 2b.

Figure 2:
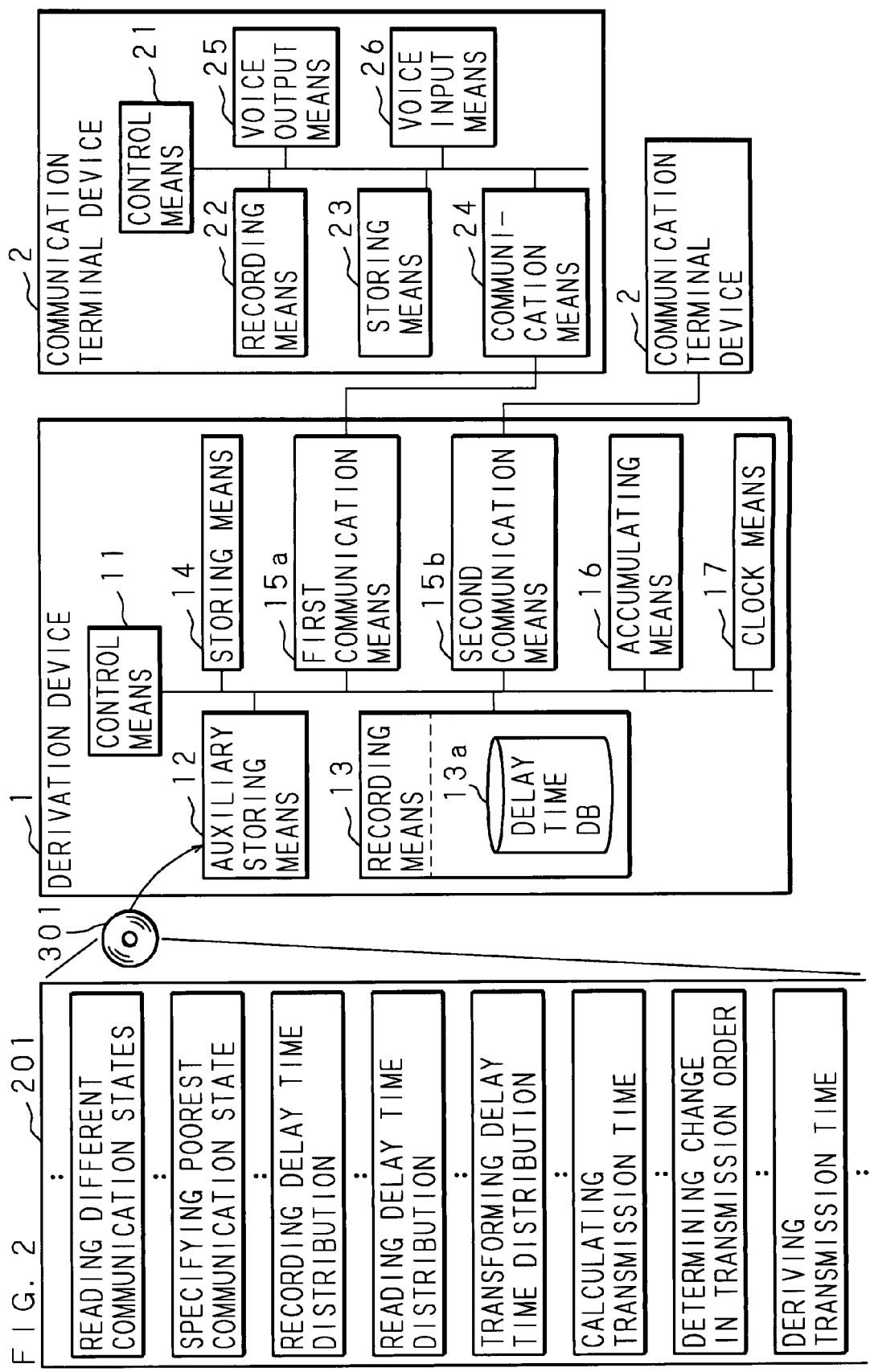
FIG. 2 is a block diagram showing a structural example of various devices included in the communication quality evaluation system of Embodiment 1 of the present invention.

FIG. 2 is a block diagram showing a structural example of various devices included in the communication quality evaluation system of Embodiment 1 of the present invention. The derivation device 1 comprises control means 11 such as a CPU for controlling the entire device; auxiliary storing means 12 such as a CD-ROM drive for reading various kinds of information from a recording medium 301 such as a CD-ROM recording thereon a computer program 201 for a derivation device of Embodiment 1 of the present invention, and various kinds of information such as data; and recording means 13 such as a hard disk for recording various kinds of information read by the auxiliary storing means 12. By reading the computer program 201 of the present invention and various kinds of information such as data from the recording means 13, storing them on storing means 14 such as a RAM for temporarily storing information, and executing various processing steps included in the computer program 201, the computer operates as the derivation device 1 of the present invention. Moreover, the derivation device 1 comprises first communication means 15a for communicating with the first communication terminal device 2a; second communication means 15b for communicating with the second communication terminal device 2b; accumulating means 16 such as a buffer memory for temporarily accumulating received packets; and clock means 17 for indicating times at which the packets accumulated in the accumulating means 16 are to be transmitted. Note that a part of the storage area of the storing means 14 may be used as the accumulating means 16. Further, a part of the recording area of the recording means 13 is used as various kinds of databases such as a delay time database (delay time DB) 13a for recording the distribution of delay times of packets. It may be possible to use a part of the recording area of other device connected to the derivation device 1 as the delay time database 13a instead of using a part of the recording area of the recording means 13 as the delay time database 13a.

The communication terminal device 2 comprises control means 21; recording means 22; storing means 23, communication means 24; voice output means 25 for transforming voice data received as a digital signal into an analog signal and outputting it as voice; and voice input means 26 for transforming an analog signal inputted as voice into voice data in the form of a digital signal. Note that it may be possible to use a general IP phone terminal device as the communication terminal device 2. The communication terminal device 2 may be in any form if it is a terminal device having an IP phone function.

FIG. 3 is a table conceptually showing an example of recorded contents in the delay time database 13a included in the derivation device 1 of Embodiment 1 of the present invention. In the delay time database 13a, items such as the packet loss rate, fixed delay, varying delay, and set values which are data related to the items are shown for the distribution of delay times. The delay time of varying delay recorded in the delay time database 13a is a delay time indicating the difference between an expected arrival time and an actual arrival time of a packet transmitted through a VoIP network to be simulated.

In the following explanation, the simply written delay time means the delay time of varying delay. The loss rate indicates by percentage the ratio of packets which were lost before arriving at their destination. In the example shown in FIG. 3, the loss rate is 3.1%. The fixed delay is a constant delay caused separately from the varying delay by factors such as a physical distance of the communication network, and the number of devices. If only the varying delay is taken into consideration, the numerical value indicating the fixed delay may not be required. The varying delay is the values showing the distribution of delay times at arrival of transmitted packets by associating classified delay times shown as a supplementary item with the occurrence rates of the delay times. In the example shown in FIG. 3, the delay time is classified every 30 ms, and the probability of occurrence of varying delay of 0 ms to 30 ms is recorded in association with varying delay indicated as 0 ms as a representative value, the probability of occurrence of varying delay of 30 ms to 60 ms is recorded in association with varying delay indicated as 30 ms as a representative value, and the probability of occurrence of varying delay of 60 ms to 90 ms is recorded in association with varying delay indicated as 60 ms as a representative value. Note that the occurrence rates of delay times indicate, by percentage, the ratios of delayed packets to the arrived packets excluding packets lost during the transmission over the VoIP network.

FIG. 4 is a table conceptually showing an example of the recorded contents of packets accumulated in the accumulating means 16 of the derivation device 1 of Embodiment 1 of the present invention. In the accumulating means 16, a scheduled transmission timing of each packet and packet data are recorded in association with an index. The scheduled transmission timing is a packet transmission timing derived by later-described processes performed by the derivation device 1. The packet data is information shown in the data section of each packet, and, in the present invention, the packet data includes information such as voice data for reproducing voice.

Figure 5:
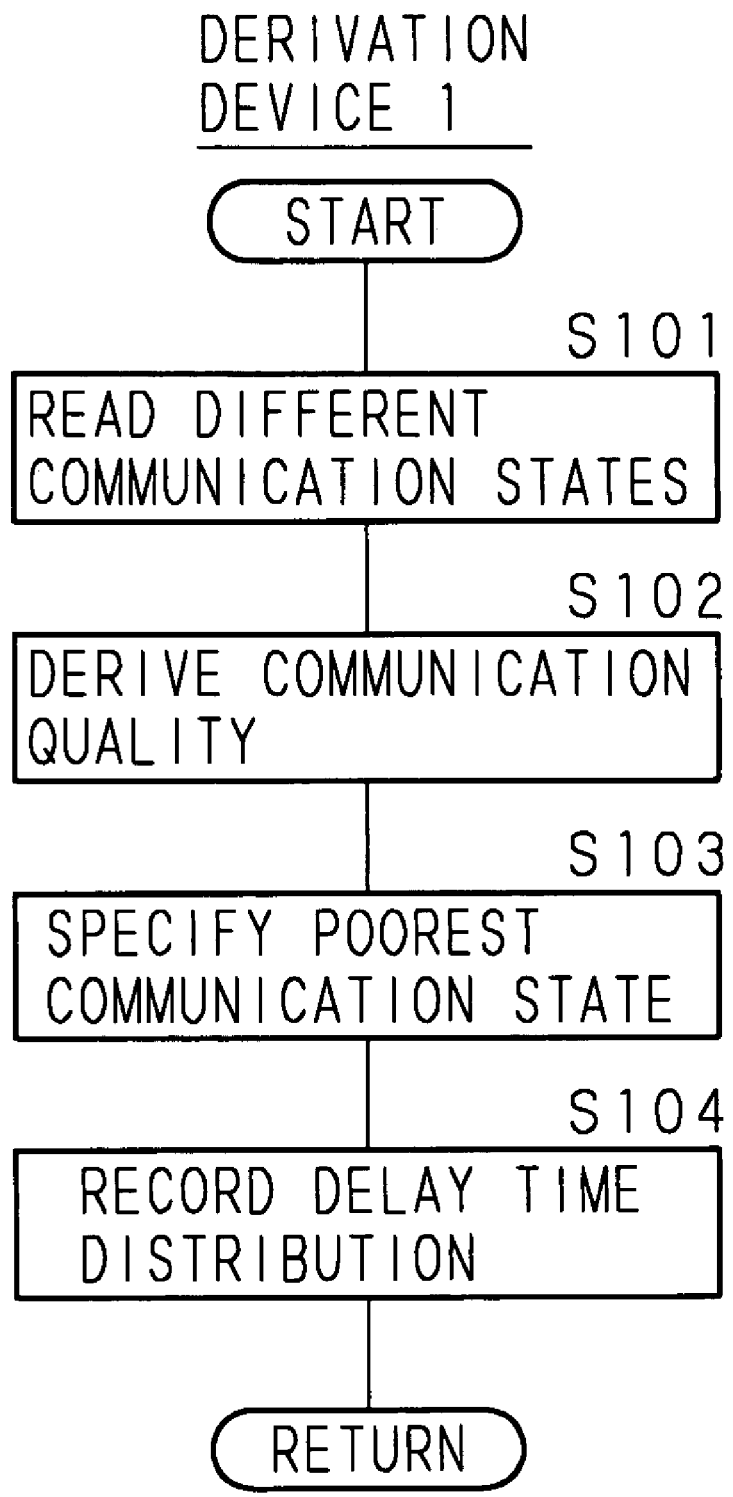
FIG. 5 is a flowchart showing a delay time distribution recording process performed by the derivation device of Embodiment 1 of the present invention.

Next, the following will explain the processes performed by various devices used in the communication quality evaluation system of Embodiment 1 of the present invention. FIG. 5 is a flowchart showing a delay time distribution recording process performed by the derivation device 1 of Embodiment 1 of the present invention. The delay time distribution recording process is the process of recording various kinds of data indicating a delay time distribution state in the delay time database 13a as a prior process performed before the process of simulating a communication state. Under the control of the control means 11 that executes the computer program 201 of the present invention stored in the storing means 14, the derivation device 1 reads communication states measured under different conditions from the recording means 13, for example (S101). The different conditions mean that there is a difference in terms of the time at which the communication states were measured. It may also be possible to read communication states from a measuring device that measured the communication states, or a recording medium on which measured values measured by the measuring device are recorded, instead of reading them from the recording means 13. Further, it may be possible to measure communication states by using the derivation device 1.

Then, under the control of the control means 11, the derivation device 1 derives, from the communication states read under each of the conditions, communication quality including the R value, packet loss rate and delay state, for each condition (S102), specifies a communication state of poorest communication quality in the communication states under the respective conditions (S103), and records the distribution of delay times in the specified communication state in the delay time database 13a (S104). The R value is an evaluated value of reproduction quality of voice according to a computational model for use in transmission planning called E-model specified in ITU-T G. 107. Here, the delay state indicates a varying delay distribution. The derivation under each condition shown in step S102 means performing a tabulation process based on the measured values, but the present invention is not limited to this, and the tabulation may be performed by a measuring device that measured the communication states, and the result of tabulation may be read in step S101. Specifying a communication state of poorest communication quality shown in step S103 determines that a communication state having the largest communication quality index calculated by Equation 1 below is the poorest communication quality.

$$\text{Communication quality index} = 100/A + B + C \times 5 \qquad \text{(Equation 1)}$$

where A: R value
B: packet loss rate (%)
C: occurrence rate (%) of varying delay of 90 ms or more.

The equation for determining communication quality is not limited to Equation 1 shown above, and may be set suitably according to purposes. Moreover, it is not necessarily to consider all of the R value, loss rate and delay state, and the poorest communication state may be specified based on any one of the R value, loss rate, and delay state.

Figure 6:
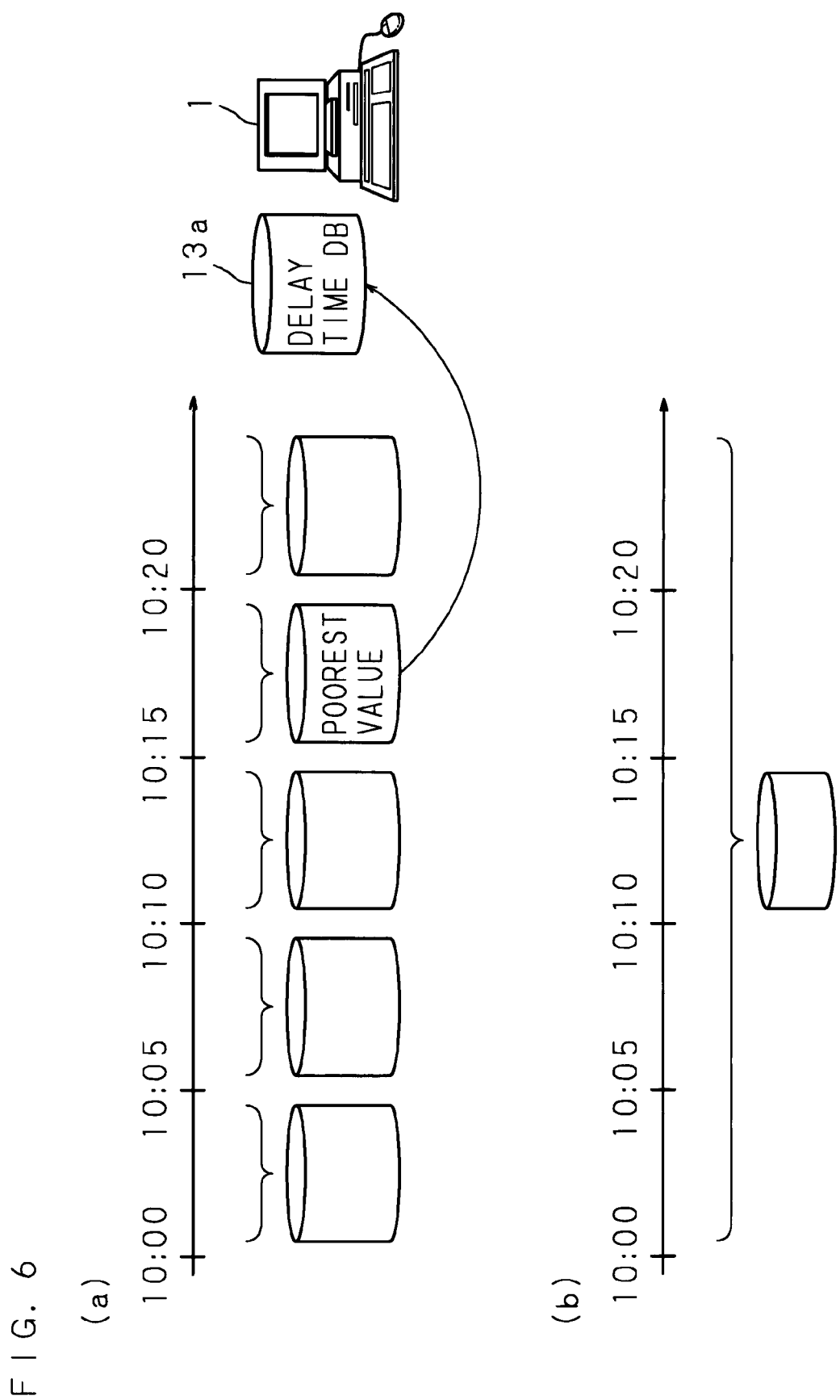
FIGS. 6(a) and 6(b) are explanatory views conceptually showing the delay time distribution recording process performed in the communication quality evaluation system of Embodiment 1 of the present invention.

FIGS. 6(a) and 6(b) are explanatory views conceptually showing the delay time distribution recording process performed in the communication quality evaluation system of Embodiment 1 of the present invention. FIG. 6(a) shows conceptually the delay time distribution process in Embodiment 1 of the present invention, and illustrates conceptually a state in which communication states were measured every five minutes from 10:00 and collected, and the communication state between 10:15 and 10:20 is specified as the communication state under the worst condition and recorded in the delay time database 13a included in the derivation device 1. FIG. 6(b) shows a conventional delay time distribution recording process given for a comparison purpose in which the distribution of delay times based on an average communication state under all conditions, here all measurement times, is recorded. Since which level of communication quality can be maintained under the worst conditions is the question in practical applications, it is apparent that the process of the present invention is superior. As a condition for classifying the communication states, for example, it may be possible to measure a communication state for each communication channel and specify the worst communication condition, instead of measuring the communication state every certain time.

Figure 7:
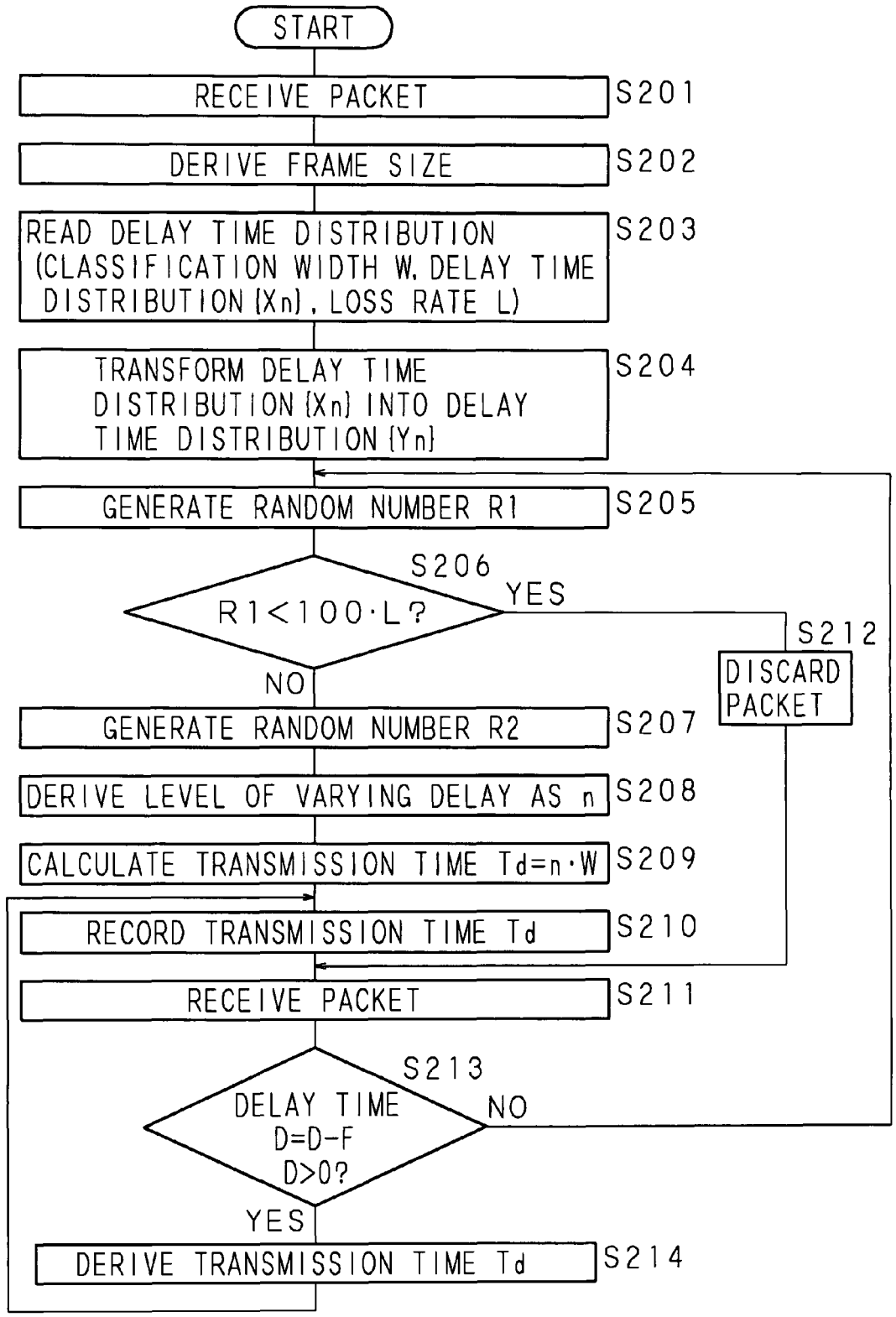
FIG. 7 is a flowchart showing a transmission timing derivation process performed by the derivation device of Embodiment 1 of the present invention.

FIG. 7 is a flowchart showing a transmission timing derivation process performed by the derivation device 1 of Embodiment 1 of the present invention. In the communication quality evaluation system of the present invention, packets including voice data are transmitted from the first communication terminal device 2a to the derivation device 1, and the derivation device 1 accumulates the packets received from the first communication terminal device 2a in the accumulating means 16, derives transmission timings, and then transmits the packets accumulated in the accumulating means 16 to the second communication terminal device 2b, based on the derived transmission timings. In the second communication terminal device 2b, voice based on voice data contained in the received packets is outputted, and a subject who listens to the voice determines communication quality. The packets including voice data are based on rules such as RTP (Realtime Transport Protocol) which is a communication rule for use in VoIP communications. Under the control of the control means 11 that executes the computer program 201 of the present invention stored in the storing means 14, the derivation device 1 receives the packets containing voice data based on the communication rule specified by the RTP (hereinafter referred to as the RTP packets) at the first communication means 15a (S201).

Then, under the control of the control means 11, the derivation device 1 derives a frame size F (ms) of voice data contained in the received RTP packets (S202). The frame size F is derived from CODEC type and the number of bytes of payload size shown as the header information of the RTP packets. If a plurality of derivation processes G for deriving later-described transmission timings are recorded, then which derivation process G is to be executed is decided at this time. Here, as the derivation process G, it is supposed to use a derivation process G1 of [transmitting {ceil(D/F)−1} packets continuously after a packet to which a delay time D (ms) is added, where ceil ( ) is a function that rounds up to an integer]. Note that it may be possible to suitably define the derivation process G according to its purpose, and, it may be possible to define various processes such as, for example, [transmitting {ceil(D/F)−1} packets continuously after waiting for a predetermined time (ms) after a packet to which a delay time D (ms) is added.].

Then, under the control of the control means 11, the derivation device 1 reads the classification width W (ms) of varying delay, delay time distribution {Xn}, and loss rate L (%) as the distribution of delay times recorded in the delay time database 13a (S203). The classification width W indicates the time interval of classifying the varying delay, and, in the example shown in FIG. 3, the classification width W=30 ms. The delay time distribution {Xn} shows the relation between the representative value and the occurrence rate of the delay time. In the following, {Xn} shows X as a 1×n matrix. When reproducing a communication state over a measured communication network, the recorded contents in the delay time database 13a recording the distribution of delay times in the measured communication state are read and used as they are in the subsequent processes, but, when simulating a communication state of a newly designed communication network, it is necessary to suitably change various kinds of information indicating the measured communication state.

Under the control of the control means 11, the derivation device 1 executes a transformation process of transforming the delay time distribution {Xn} read from the delay time database 13a into a delay time distribution {Yn} by a predetermined transformation method including the frame size F, derivation process G, and classification width W as parameters (S204). The transformation process shown in step S204 is the process of transforming the distribution of delay times in advance so that a distribution of delay times based on adjusted transmission timings derived using the derivation process G1 becomes identical to the delay time distribution {Xn} before transformed, which is recorded in the delay time database 13a. The detail of the transformation process will be described later.

Under the control of the controlling means 11, the derivation device 1 generates a random number R1 that takes any one value which is not smaller than 0 but is smaller than 10000 as a process using the derivation process G1 (S205), and determines whether or not the generated random number R1 is smaller than 100× packet loss rate L (%) (S206). By performing the processing of steps S205 and S206, a state in which the packets being transmitted over the VoIP network are lost in the ratio represented by the loss rate L (%) is simulated.

When a determination is made in step S206 that the random number R1 is not smaller than 100× packet loss rate L (%) (S206: NO), the derivation device 1 judges that the packets arrived without being lost, and generates a random number R2 that takes any one value which is not smaller than 0 but is smaller than 10000 (S207), and derives the level of the classified varying delay as n by finding a maximum M satisfying Expression 2 shown below (S208), under the control of the control means 11. Since the transformed delay time distribution {Yn} is the result of transforming the delay time distribution {Xn} recorded in the delay time database 13a, the varying delay is classified by the classification width W corresponding to an interval of 30 ms, and each classified level is associated with the occurrence rate of delay time. In Equation 2, the level of the classified varying delay with a representative value of 0 ms is defined as level 0, and level M of delay having the smallest m among varying delay level m satisfying the following conditional expression is derived according to the occurrence rate based on the random number R2.

[Expression 1]

$$100 \cdot \sum_{m=0}^{M} Ym > R2 \quad \text{(Equation 2)}$$

where
Ym: transformed delay time distribution,
R2: random number that is not smaller than 0 but is smaller than 10000,
M: classified varying delay level.

In the derivation device 1, under the control of the control means 11, the time at which the packet was received is defined as a predetermined transmission timing at which the packet should primarily be transmitted, a time after a delay time D, which is indicated as the classified delay time level n× classification width W (ms), from the predetermined transmission timing is calculated as a packet transmission timing Td to which the delay time is added (S209), and the received packet is recorded in association with the calculated transmission timing Td in the accumulating means 16 (S210). The recorded state in step S210 is schematically shown in FIG. 4. The calculated transmission timing Td is used as a scheduled transmission timing, and packet data about the packet is recorded in association with the scheduled transmission timing.

Then, in the derivation device 1, under the control of the control means 11, a RTP packet transmitted next is received at the first communication means 15a (S211). When a determination is made in step S206 that the random number R1 is smaller than 100× packet loss rate L (%) (S206: YES), the derivation device 1 judges that this packet was lost, discards the received packet without performing the process of accumulating the packet shown in steps S207 to S210 (S212), and proceeds to step S211 to receive the next RTP packet (S211), under the control of the control means 11.

Then, the derivation device 1 defines a value obtained by subtracting the frame size F from the delay time D calculated in step S209 as a new delay time D, and determines whether or not the new delay time D is greater than 0 (S213). Specifically, the derivation device 1 calculates D=D−F, and determines whether D>0 is true or false. In the determination process of step S213, a determination is made as to whether or not the packet transmission order is changed by the transmission timing Td to which the delay time is added, calculated in step S209.

In step S213, when a determination is made that the new delay time D is greater than 0 (S213: YES), the transmission timing of a packet received later becomes earlier than the transmission timing of the previously received packet due to the large delay time D, and thus the derivation device 1 judges that there is a possibility that the packet transmission order may be changed, and derives a time after the delay time D calculated in step S213 from the predetermined transmission timing based on the received time of this packet as a packet transmission timing Td to which the delay time is added (S214), and proceeds to step S210 to record the received packet in association with the derived transmission timing Td in the accumulating means 16 (S210). In other words, through the processing of steps S213 to S214 and S210, the derivation device 1 prevents a change in the packet transmission order by adjusting the transmission timings of packets received later, whose transmission order is later than the previously received packet whose transmission order based on the transmission timing Td to which the delay time is added, may possibly be later than the original transmission order.

In step S213, when a determination is made that the new delay time D is not greater than 0 (S213: NO), the derivation device 1 judges that there is no possibility that the packet transmission order may be changed, and then proceeds to step S205 and repeats the subsequent processes. Thus, the processing of steps S201 to S204 are applied only to the first received packet, and the derivation of the transmission timing Td or discarding is performed for packets received after the first received packet by the processing of steps S205 to S214 using the derivation process G1. Note that if the derivation process G is a process other than the derivation process G1, the process shown in steps S205 to S214 is suitably changed. For example, when simulating a communication network having a possibility that the packet arrival order may be changed, it may be possible to use the derivation process G in which the transmission timing Td is adjusted based on a condition other than a change in the transmission order.

Figure 8:
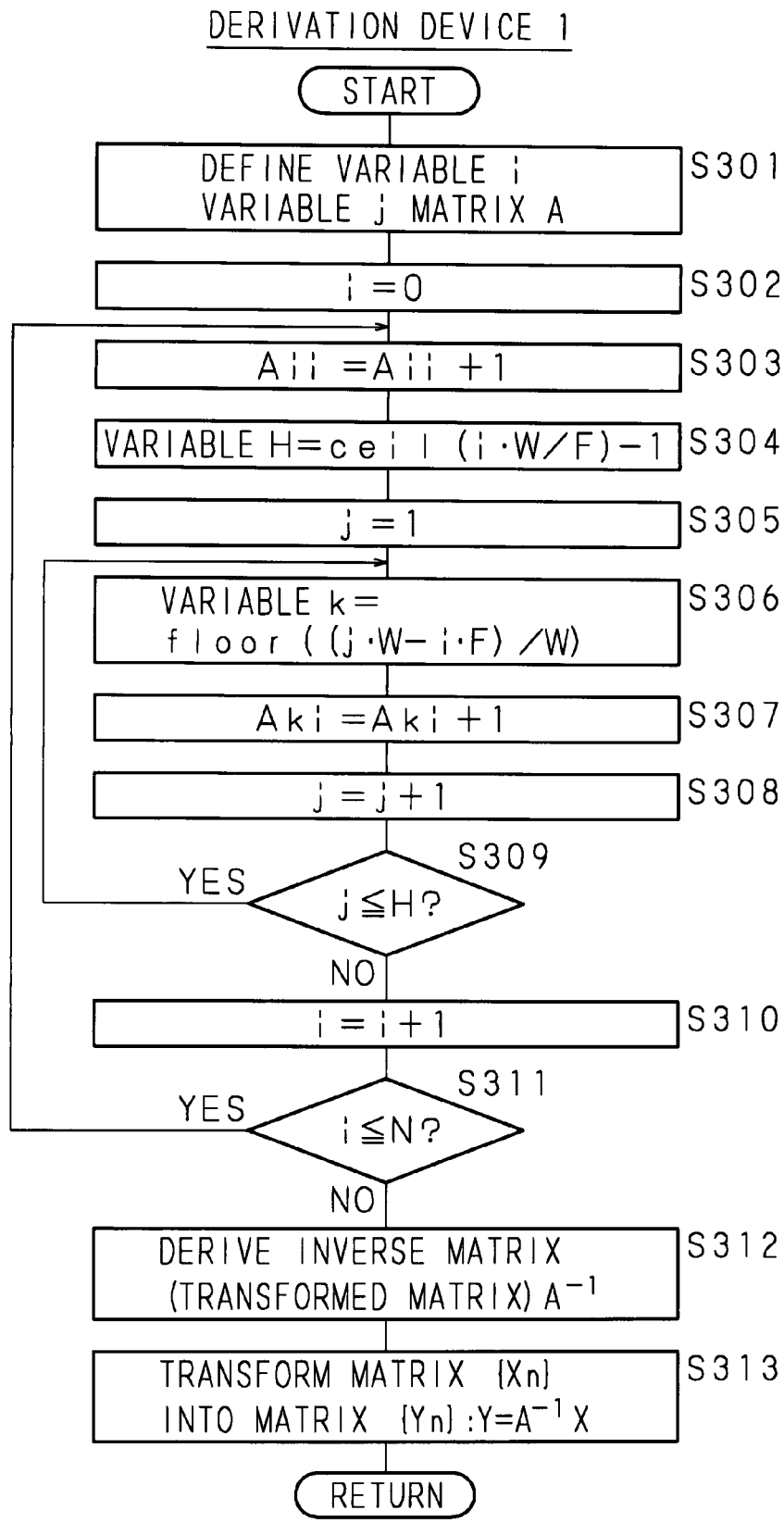
FIG. 8 is a flowchart showing a delay time distribution transforming process performed by the derivation device of Embodiment 1 of the present invention.

FIG. 8 is a flowchart showing a delay time distribution transforming process performed by the derivation device 1 of Embodiment 1 of the present invention. In the derivation device 1, in step S204 of the transmission timing derivation process explained using FIG. 7, a transformation process for transforming the delay time distribution {Xn} read from the delay time database 13a is executed. Under the control of the control means 11 that executes the computer program 201 of the present invention stored in the storing means 14, the derivation device 1 defines a variable i and a variable j for $0 \leq i, j \leq N$, and an N×N matrix A={Aij} indicated using the variable i and variable j, and performs initialization with all elements Aij=0 of A (S301).

Then, under the control of the control means 11, the derivation device 1 substitutes 0 for the variable i so that i=0 (S302), adds 1 to a diagonal element Aii of the matrix A so that Aii=Aii+1 (S303), and defines a variable H given by ceil (i·W/F)−1: (where ceil ( ) is a function that rounds up to an integer) using the classification width W and frame size F (S304). Next, under the control of the control means 11, the derivation device 1 substitutes 1 for the variable j so that j=1 (S305), and defines a variable k which is given by floor ((i·W−j·F)/W): (where floor( ) is a function that rounds down to an integer) using the classification width W and frame size F (S306). The derivation device 1, under the control of the control means 11, adds 1 to an element Aki of the matrix A so that Aki=Aki+1 (S307), adds 1 to the variable j so that j=j+1 (S308), and determines whether or not an expression $j \leq H$ for comparing the variable j and the variable H is true or false (S309).

In step S309, if a determination is made that the variable j is greater than the variable H and the expression $j \leq H$ is false (S309: NO), the derivation device 1 adds 1 to the variable i so that i=i+1 (S310), and determines whether or not an expression $i \leq N$ for comparing the variable i and the variable N is true or false (S311), under the control of the control means 11. In step S309, if a determination is made that the expression $j \leq H$ is true (S309: YES), the derivation device 1 returns to step S306 and repeats the subsequent processes.

In step S311, if a determination is made that the expression $i \leq N$ is true (S311: YES), the derivation device 1 returns to step S303 and repeats the subsequent processes. In step S311, if a determination is made that the expression $i \leq N$ is false (S311: NO), a judgment is made that the calculation of matrix A has been completed, and the derivation device 1 derives an inverse matrix $A^{-1}$ of the matrix A as a transformed matrix (S312), under the control of the control means 11.

Then, in the derivation device 1, under the control of the control means 11, a matrix {Yn} is derived by transforming a matrix {Xn} indicating the delay time distribution using the derived transformed matrix $A^{-1}$ (S313). More specifically, Y is calculated by the product $A^{-1}X$ of the matrix. If the derivation process G is a process other than the derivation process G1, then the processes shown in steps S301 to S311 are suitably changed. It may also be possible to derive a transformed matrix $A^{-1}$ for each derivation process G, frame size F, and classification width W in advance, and records it in association with the derivation process G, frame size F, and classification width W.

The processes shown in steps S301 to S311 may be interpreted as follows. If the delay time distribution that is an input value to be given in and after step S205 can be expressed as a column matrix {X1n} of n columns, when the processing in and after step S205 of the transmission timing derivation process shown using FIG. 7 is executed under a condition of L=0, then the derived delay time distribution is a column matrix {X2n} of n columns. Then, a matrix A satisfying the relation X1=AX2 is calculated, and further an inverse matrix $A^{-1}$ of the matrix A is calculated. For the inverse matrix $A^{-1}$, since the relation $X2=A^{-1}X1$ is established, it is possible to consider the inverse matrix $A^{-1}$ as a transformation matrix for transforming a matrix {X1n} into a matrix {X2n}. When the processing in and after step S205 of the transmission timing derivation process shown using FIG. 7 is executed, the transformed matrix by the inverse matrix $A^{-1}$ becomes the matrix before the transformation by the inverse matrix $A^{-1}$. In other words, if the delay time distribution {Xn} before the transformation, which is recorded in the delay time database 13a, is transformed into the delay time distribution {Yn} after the transformation in advance by using the transformation matrix $A^{-1}$, when the processing in and after step S205 of the transmission timing derivation process shown using FIG. 7 is executed, the delay time distribution becomes {Xn}. The above-described processing shown in steps S301 to S311 is the calculation process for obtaining the matrix A that is the premise of such a transformation process. For example, when the frame size F=20 ms and the classification width W=30 ms, if a specific example of the delay time distribution {Xn} before the transformation is given by Equation 3 below, then the delay time distribution {Yn} after the transformation is given by Equation 4 shown below.

[Expression 2]

$$\begin{pmatrix} X0 \\ X1 \\ X2 \\ X3 \\ X4 \\ X5 \\ X6 \end{pmatrix} = \begin{pmatrix} 65.0\% \\ 10.0\% \\ 10.0\% \\ 5.0\% \\ 5.0\% \\ 3.0\% \\ 2.0\% \end{pmatrix} \quad \text{(Equation 3)}$$

$$\begin{pmatrix} Y0 \\ Y1 \\ Y2 \\ Y3 \\ Y4 \\ Y5 \\ Y6 \end{pmatrix} = \begin{pmatrix} 87.7\% \\ 0.0\% \\ 6.2\% \\ 1.5\% \\ 0.0\% \\ 1.5\% \\ 3.1\% \end{pmatrix} \quad \text{(Equation 4)}$$

Figure 9:
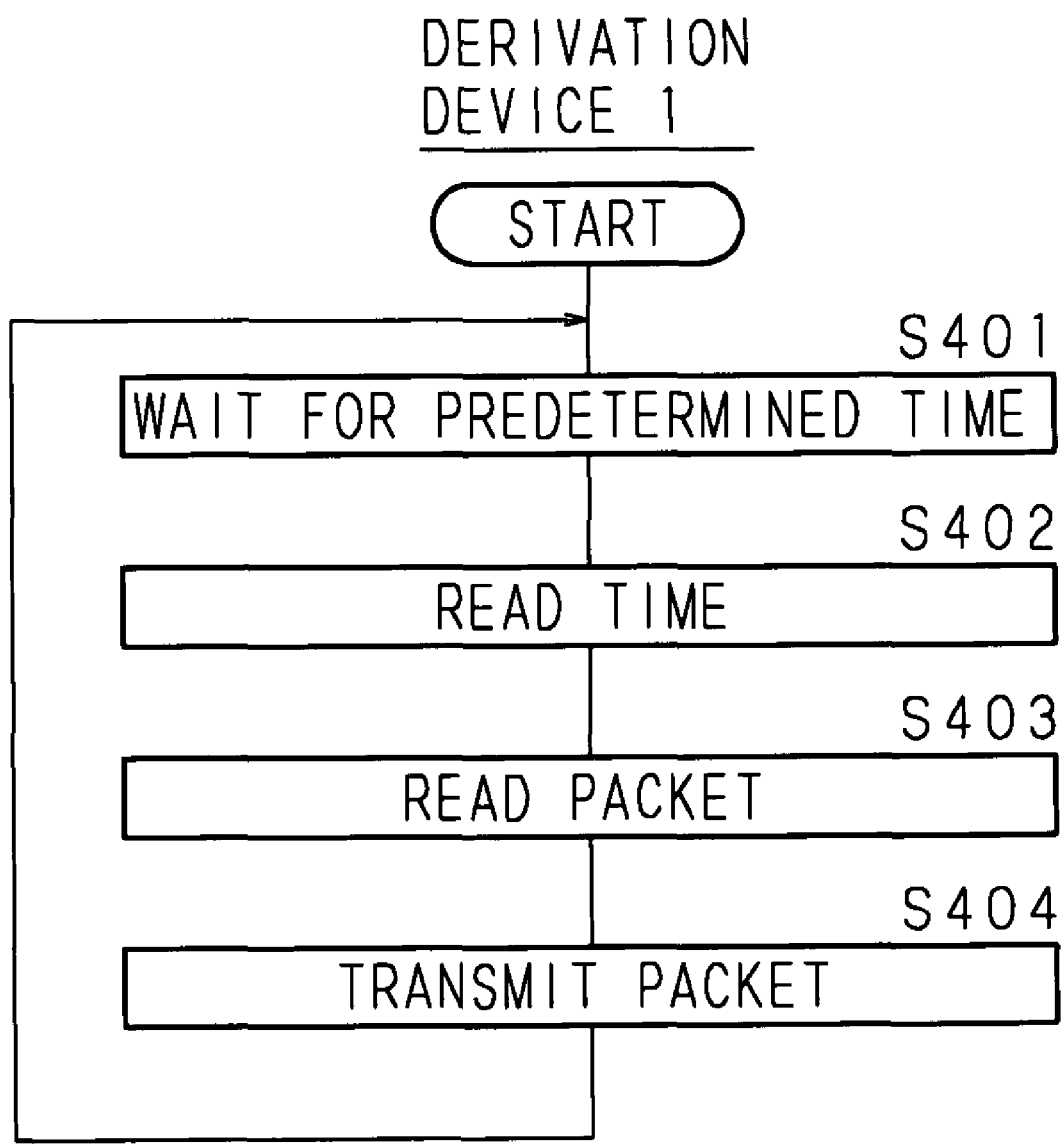
FIG. 9 is a flowchart showing a packet transmitting process performed by the derivation device of Embodiment 1 of the present invention.

FIG. 9 is a flowchart showing a packet transmitting process performed by the derivation device 1 of Embodiment 1 of the present invention. Under the control of the control means 11 that executes the computer program 201 of the present invention stored in the storing means 14, the derivation device 1 waits for a predetermined time such as 1 ms (S401), reads a time T indicated by the clock means 17 (S402), compares the read time T with the packet transmission timing Td recorded in the accumulating means 16 and reads a RTP packet satisfying the Td≦T relation from the accumulating means 16 (S403), transmits the read RTP packet from the second communication means 15b to the second communication terminal device 2b (S404), returns to step S401 and repeats the subsequent processes. In this manner, the derivation device 1 transmits RTP packets to the second communication terminal device 2b based on the derived transmission timings Td, and the subject who operates the second communication terminal device 2b audits voice outputted from the second communication terminal device 2b based on the received RTP packets. The quality of the outputted voice is communication quality of the reproduction of a communication state of the communication network through which the RTP passes, based on the information recorded in the delay time database 13a.

Although Embodiment 1 described above illustrates a mode of deriving a transmission timing when transmitting a RTP packet received by the derivation device from the first communication terminal device to the second communication terminal device, the present invention is not limited to this, and may be developed in various modes such as a mode in which RTP packets or voice data to be transmitted are recorded in the derivation device in association with transmission timings in advance, transmission timings are derived based on the transmission timings and communication conditions recorded in association with each other when reproducing a communication state, and RTP packets produced from the recorded RTP packets or voice data are transmitted to the communication terminal device on the receiving end, based on the derived transmission timings.

Moreover, although Embodiment 1 described above illustrates a mode in which a communication state of a VoIP network used as an IP phone is derived and reproduced to evaluate communication quality, the present invention is not limited to this, and may be developed in various modes, such as a mode in which it is used to evaluate communication quality related to video streaming of television images. Further, it is apparent that the transmitting and receiving directions between the first communication terminal device and the second communication terminal device may be switched, or bidirectional communication may be performed. It may also be possible to use a derivation process in which the packet transmission timings are switched.

Embodiment 2

Figure 10:
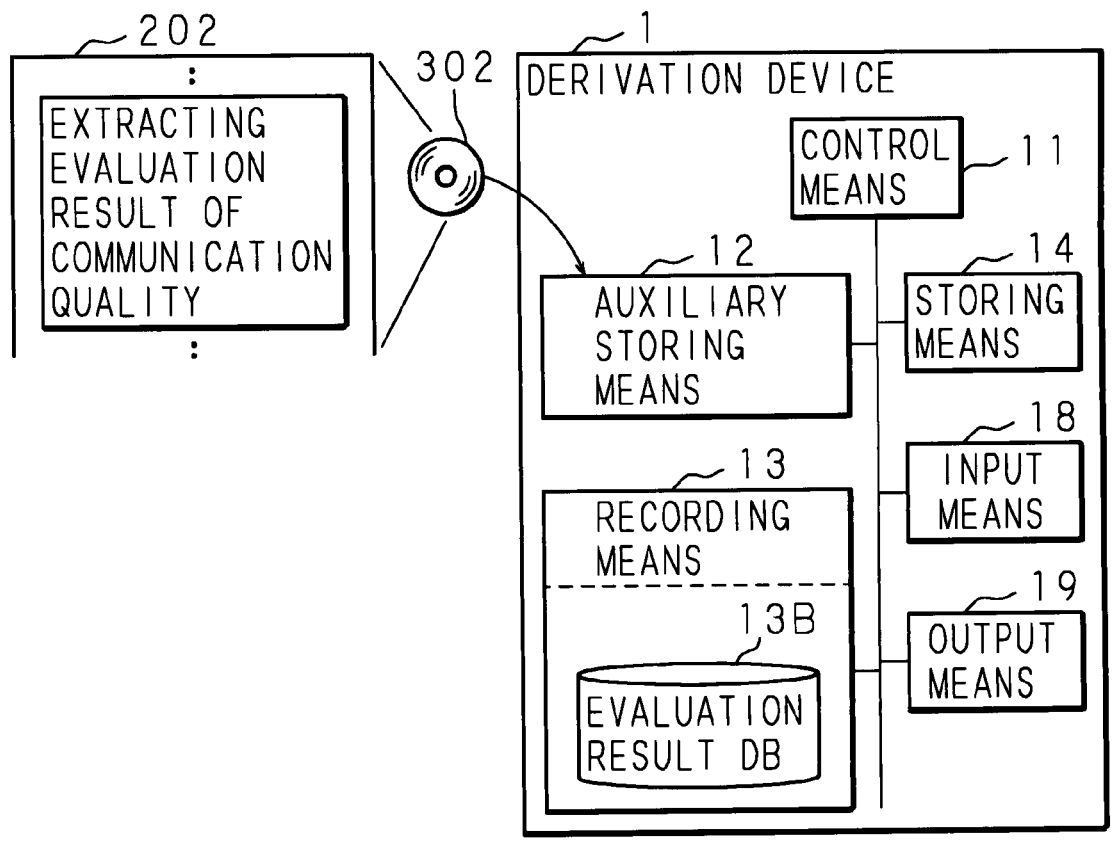
FIG. 10 is a block diagram showing a structural example of a derivation device included in a communication quality evaluation system of Embodiment 2 of the present invention.

Embodiment 2 is a mode in which communication quality is evaluated without reproducing a communication state if communication conditions are general. FIG. 10 is a block diagram showing a structural example of a derivation device included in a communication quality evaluation system of Embodiment 2 of the present invention. The derivation device 1 comprises auxiliary storing means 12 for reading various kinds of information from a recording medium 302 on which a computer program 202 for a derivation device of Embodiment 2 of the present invention and various kinds of information such as data are recorded; recording means 13; storing means 14; input means 18 such as a keyboard and a mouse; and output means 19 such as a monitor and a printer. A part of the recording area of the recording means 13 is used as an evaluation result database (evaluation result DB) 13b for recording communication conditions and evaluation results of communication quality in association with each other.

FIG. 11 is a conceptual view showing an example of recorded contents in the evaluation result database 13b included in the derivation device 1 of Embodiment 2 of the present invention. In the evaluation result database 13b, communication conditions showing the characteristics of devices and the characteristics of a communication network to be used for communications, and evaluation results indicating communication quality by numerical values are recorded in association with each other. The characteristics of devices are the characteristics of a communication terminal device that transmits RTP packets, and the characteristics of a communication terminal device that receives RTP packets. The characteristics of a communication network are the characteristics indicating the communication state of the communication network. The communication conditions and communication quality recorded in the evaluation result database 13b were obtained by quality evaluation tests conducted in advance.

FIG. 12 is a table conceptually showing an example of the contents of characteristics of a communication terminal device recorded in the evaluation result database 13b included in the derivation device 1 of Embodiment 2 of the present invention. FIG. 12 illustrates in further detail the contents expressed as "AAA" and "BBB" as the characteristics of the communication terminal devices in FIG. 11. As shown in FIG. 12, as the characteristics of a communication terminal device, data are recorded for various kinds of items such as the device name of the communication terminal device, CODEC type, buffer length, and PLC (Packet Loss Concealment). The items shown in FIG. 12 are merely one example, and it may be possible to add a variety of items according to a need.

FIG. 13 is a table conceptually showing an example of the contents of characteristics of a communication network recorded in the evaluation result database 13b included in the derivation device 1 of Embodiment 2 of the present invention. FIG. 13 illustrates in further detail the contents expressed as "Characteristics 1" and "Characteristics 2" for the characteristics of the communication network in FIG. 11. As shown in FIG. 13, as the characteristics of a communication network, data are recorded for various kinds of items such as the communication state measurement start time, measuring time, R value, loss rate, fixed delay, and varying delay. The items shown in FIG. 13 are merely one example, and it may be possible to add a variety of items according to a need.

Figure 14:
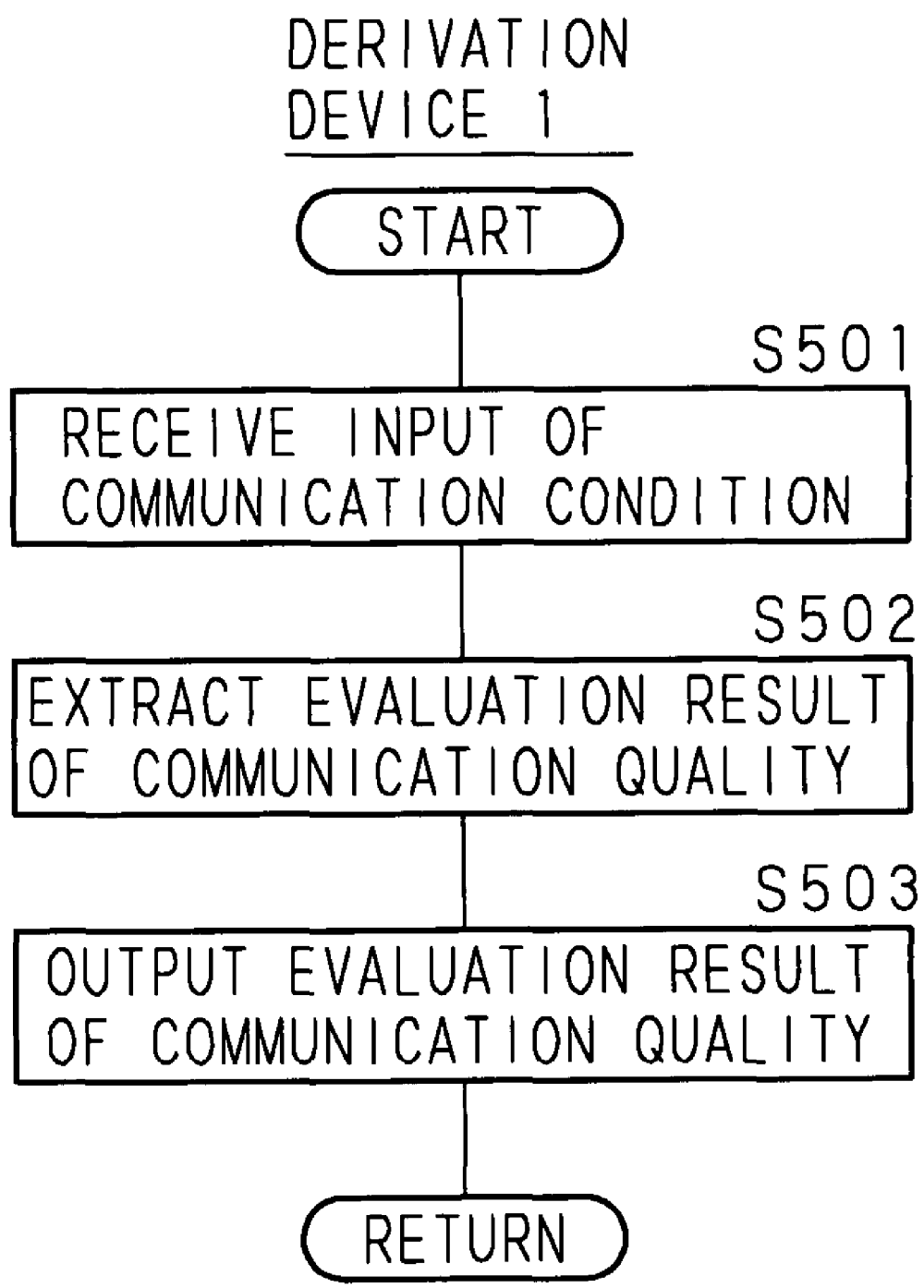
FIG. 14 is a flowchart showing a communication quality evaluating process performed by a derivation device 1 of Embodiment 2 of the present invention.
Figure 17:
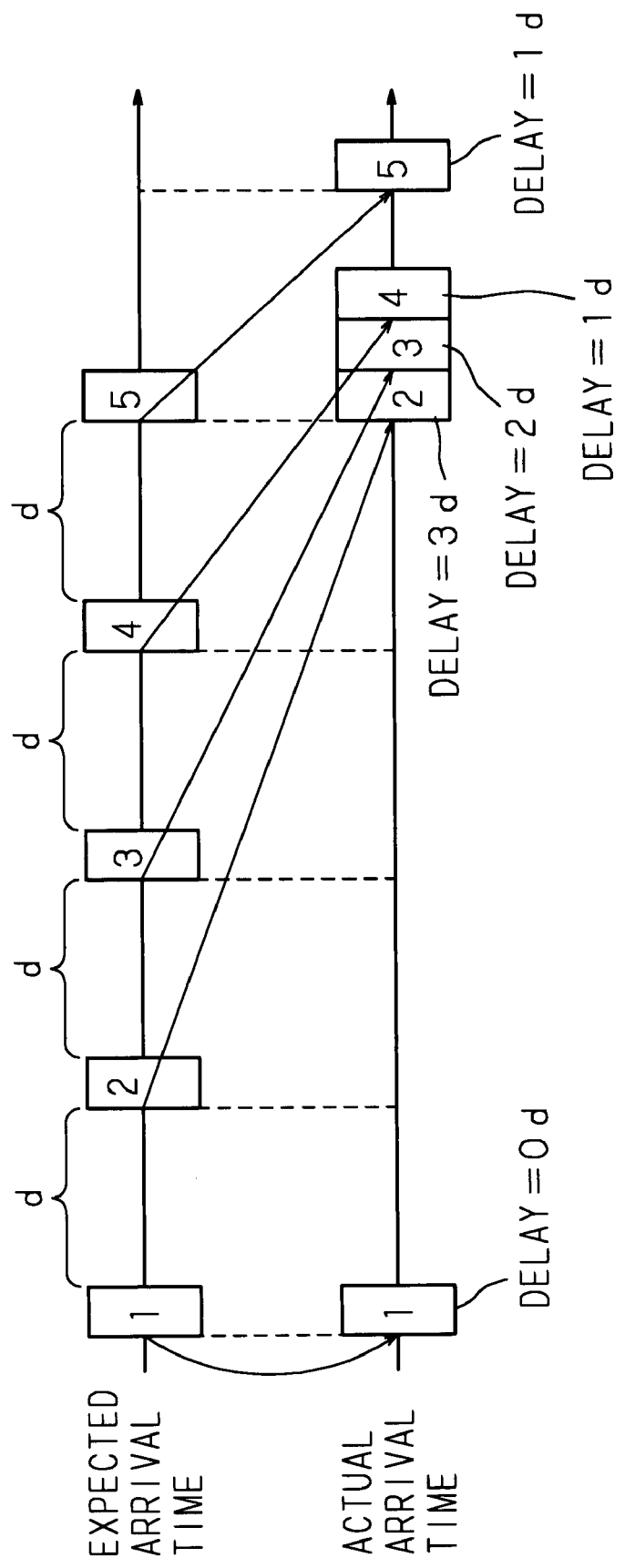
FIG. 17 is an explanatory view showing schematically the delay in the arrival time of packets.
Figure 18:
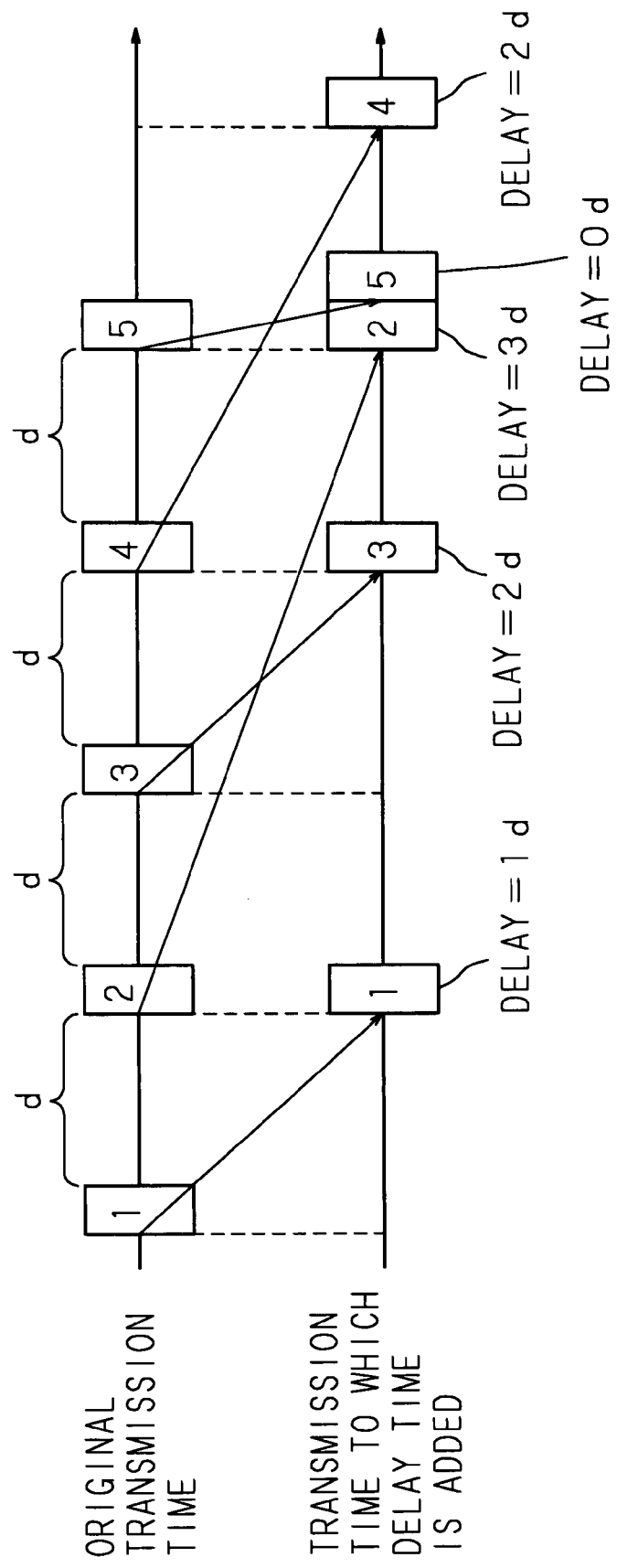
FIG. 18 is an explanatory view showing schematically the results of conducting simulation tests about the communication state of a VoIP network, based on measurement results.
Figure 19:
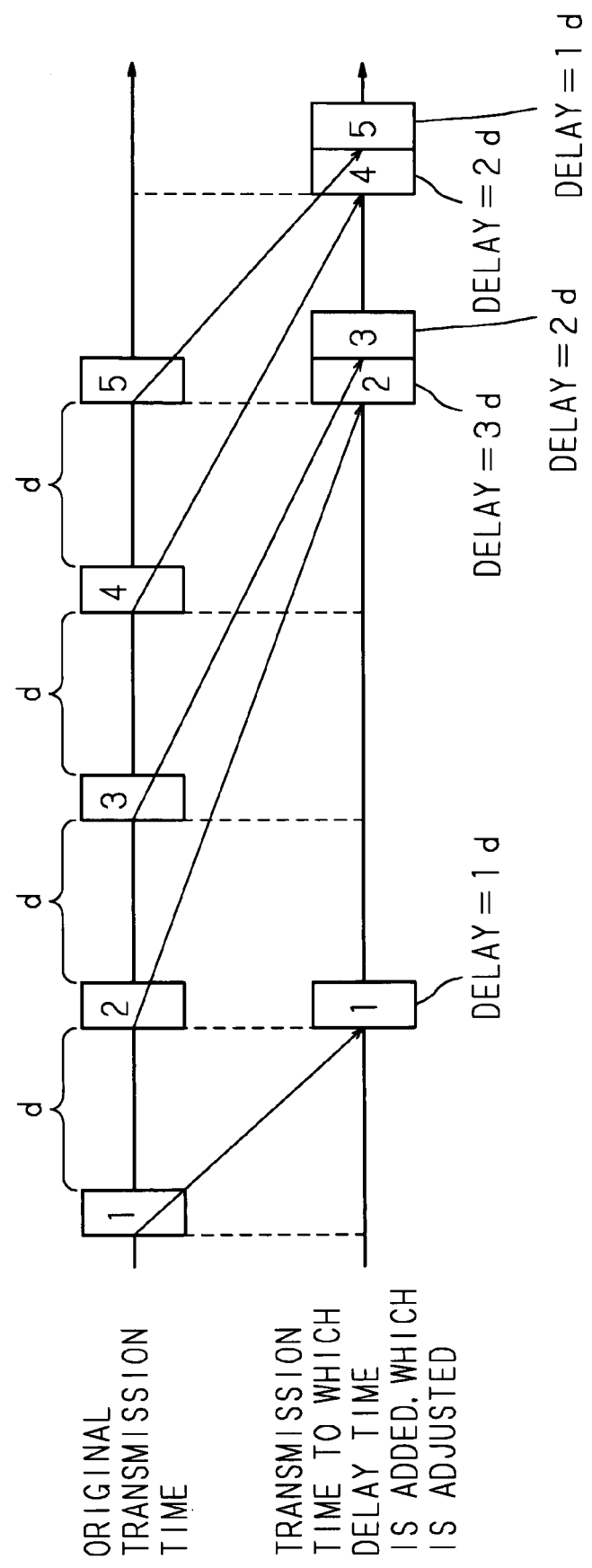
FIG. 19 is an explanatory view showing schematically the results of conducting simulation tests about the communication state of the VoIP network, based on measurement results.

Next, the following description will explain the processes performed by the derivation device 1 for use in a communication quality evaluation system of Embodiment 2 of the present invention. FIG. 14 is a flowchart showing a communication quality evaluating process performed by the derivation device 1 of Embodiment 2 of the present invention. In Embodiment 2 of the present invention, the characteristics of a communication network to be evaluated for communication quality are measured or supposed in advance, communication terminal devices to be used are determined, and then an operator of the derivation device 1 inputs the measured or supposed characteristics of the communication network and the characteristics of the determined communication terminal devices into the derivation device 1. As the input method, it may be possible to select a suitable method, such as inputting using the input means 18, reading various characteristics recorded in a recording medium by the auxiliary storing means 12, or reading from other connected device. Under the control of the control means 11 that executes the computer program 202 of the present invention stored in the storing means 14, the derivation device 1 receives an input of the characteristics of a communication network and the characteristics of communication terminal devices on the sending end and the receiving end, namely communication conditions (S501), extracts the evaluation result of communication quality associated with communication conditions identical or approximate to the received communication conditions from the evaluation result database 13b (S502), and outputs them from the output means 19 indicated by the extracted evaluation result of communication quality (S503). The evaluation result of communication quality thus outputted can be taken as the evaluation result of communication quality related to the communication state of a VoIP network composed of the supposed devices and communication network.

In step S502, if there are recorded communication conditions identical to the received communication conditions in the evaluation result database 13b, the evaluation result of communication quality associated with the communication conditions is extracted. However, if there are no recorded communication conditions identical to the received communication conditions in the evaluation result database 13b, the most approximate communication conditions to the received communication conditions are determined. Regarding the characteristics of communication terminal devices which are one of the communication conditions, since there is a high possibility that matching communication conditions may have already been recorded in the evaluation result database 13b except for a specially designed device, approximate communication conditions are determined by comparing the characteristics of the communication networks.

The comparison of the characteristics of the communication networks is performed by comparing the received communication network characteristics with data recorded for various kinds of items as the characteristics of communication networks in the evaluation result database 13b by using a predetermined method. For example, the derivation device 1 determines that the characteristics of a communication network whose evaluated value V given by Equation 5 below is the smallest are the most approximate communication network characteristics.

$$V=|Ka-Fna|+|Kb-Fnb|+|Kc-Fnc|+|Kd-Fnd| \quad \text{(Equation 5)}$$

where V: evaluated value,

Ka: varying delay of 0 ms under the received communication conditions (distributed ratio), Fna: varying delay of 0 ms under the recorded communication conditions (distributed ratio), Kb: varying delay of 30 ms under the received communication conditions (distributed ratio), Fnb: varying delay of 30 ms under the recorded communication conditions (distributed ratio), Kc: varying delay of 60 ms under the received communication conditions (distributed ratio), Fnc: varying delay of 60 ms under the recorded communication conditions (distributed ratio), Kd: varying delay of 90 ms under the received communication conditions (distributed ratio), and Fnd: varying delay of 90 ms under the recorded communication conditions (distributed ratio).

FIGS. 15, 16(a), 16(b) and 16(c) are tables conceptually showing examples of characteristics of a communication network in the communication quality evaluation system of Embodiment 2 of the present invention. FIG. 15 shows the characteristics of a communication network related to the received communication conditions, and FIGS. 16(a), 16(b) and 16(c) show Characteristics 1, Characteristics 2, and Characteristics 3, respectively, recorded in the evaluation result database 13b. When the evaluated value V is calculated using the characteristics of the communication network shown as examples in FIGS. 15, 16(a), 16(b), and 16(c), an evaluated value V1 of Characteristics 1, an evaluated value V2 of Characteristics 2, and an evaluated value V3 of Characteristics 3 are as follows.

$$V1=|61-95|+|14-3|+|7-2|+|8-0|=58$$

$$V2=|61-62|+|14-13|+|7-8|+|8-7|=4$$

$$V3=|61-50|+|14-30|+|7-10|+|8-10|=3$$

In this case, since the magnitude relation is V2<V3<V1, Characteristics 2 are determined to be the most approximate characteristics.

Embodiment 2 described above illustrates a mode in which evaluated values are calculated and then the characteristics of an approximate communication network are determined, but the present invention is not limited to this, and it may be possible to develop the present invention in various modes by using other mathematical technique such as, for example, approximating the distribution of varying delay by a quadratic curve and determining the characteristics of a communication network based on the degree of approximation.

The invention claimed is:

1. A communication quality evaluation method for evaluating communication quality by deriving communication states of a plurality of packets which are to be transmitted from a communication terminal device to another communication terminal device successively at predetermined transmission timings, comprising:

obtaining a pre-recorded distribution of delay times for desired arrival timings of packets at said another communication terminal device;

transforming the obtained distribution of delay times;

receiving, at said another communication terminal device, the plurality of packets successively transmitted from the communication terminal device to said another communication terminal device;

calculating packet transmission timings to which delay times are added, based on the transformed distribution of delay times and the predetermined transmission timings; and evaluating communication quality based on the calculated packet transmission timings.

2. The communication quality evaluation method as set forth in claim 1, further comprising:
obtaining each of communication states measured under different conditions;
specifying a communication state of poorest communication quality among the obtained communication states; and
recording a distribution of delay times in the specified communication state.

3. A communication quality evaluation method for evaluating communication quality by deriving communication states of a plurality of packets which are to be transmitted from a communication terminal device to another communication terminal device successively at predetermined transmission timings, comprising:
obtaining a pre-recorded distribution of delay times for desired arrival timings of packets at said another communication terminal device;
transforming the obtained distribution of delay times;
receiving, at said another communication terminal device, the plurality of packets successively transmitted from the communication terminal device to said another communication terminal device;
calculating packet transmission timings to which delay times are added, based on the transformed distribution of delay times and the predetermined transmission timings;
determining whether packet transmission order is changed by the calculated transmission timings to which delay times are added;
deriving packet transmission timings adjusted so as not to cause a change in the transmission order when a determination is made that the packet transmission order is changed; and
evaluating communication quality based on the derived packet transmission timings.

4. The communication quality evaluation method as set forth in claim 3, further comprising:
obtaining each of communication states measured under different communication conditions;
specifying a communication state of poorest communication quality among the obtained communication states; and
recording a distribution of delay times in the specified communication state.

5. The communication quality evaluation method according to claim 4, further comprising:
receiving an input of a communication condition; and
extracting an evaluation result of communication quality corresponding to a communication condition identical and/or approximate to the received communication condition, based on a prerecorded relation between a communication condition and an evaluation result of communication quality corresponding to the communication condition.

6. A derivation device for deriving communication states of a plurality of packets which are to be transmitted successively at predetermined transmission timings, comprising:
a receiving unit receiving a packet transmitted from outside;
a storing unit storing the packet received by the receiving unit;
a delay time database recording a pre-desired distribution of delay times at arrival of packets;
a controller capable of:
reading the distribution of delay times recorded in said delay time database;
transforming the read distribution of delay times; and
calculating packet transmission timings to which delay times are added, based on the transformed distribution of delay times and the predetermined transmission timings; and
a transmitting unit transmitting the packets to outside, which are stored by the storing unit, in accordance with the packet transmission timings calculated by the controller.

7. A derivation device for deriving communication states of a plurality of packets which are to be transmitted successively at predetermined transmission timings, comprising:
a delay time database recording a distribution of delay times at arrival of transmitted packets;
means for reading the distribution of delay times recorded in said delay time database;
means for transforming the read distribution of delay times; and
means for calculating packet transmission timings to which delay times are added, based on the transformed distribution of delay times and the predetermined transmission timings.

8. A derivation device for deriving communication states of a plurality of packets which are to be transmitted successively at predetermined transmission timings, comprising:
a receiving unit receiving a packet transmitted from outside;
a storing unit storing the packet received by the receiving unit;
a delay time database recording a pre-desired distribution of delay times at arrival of packets;
a controller capable of:
reading the distribution of delay times recorded in said delay time database;
transforming the read distribution of delay times;
calculating packet transmission timings to which delay times are added, based on the transformed distribution of delay times and the predetermined transmission timings;
determining whether a packet transmission order is changed by the calculated transmission timings to which delay times are added; and
deriving packet transmission timings adjusted so as not to cause a change in the transmission order when a determination is made that the packet transmission order is changed; and
a transmitting unit transmitting the packets to outside, which are stored by the storing unit, in accordance with the packet transmission timings calculated by the controller.

9. The derivation device as set forth in claim 8, wherein the read distribution of delay times is transformed so that the distribution of delay times based on transmission timings derived by said controller becomes identical to the distribution of delay times recorded in the delay time database.

10. The derivation device as set forth in claim 8, wherein said controller is further capable of adjusting the transmission timings of packets whose transmission order based on the transmission timings to which delay times are added, is different from an original transmission order.

11. The derivation device as set forth in claim 8,
wherein the delay time database records the delay times at arrival of transmitted packets and occurrence rates of the delay times in association with each other as a distribution of delay times, and
wherein the read distribution of delay times is transformed by transforming the occurrence rates of delay times.

12. The derivation device as set forth in claim 8, wherein the delay time database records a loss rate at arrival of transmitted packets, and said controller is further capable of:
  reading the loss rate recorded in the delay time database; and
  discarding a packet to be transmitted, based on the read loss rate.

13. The derivation device as set forth in claim 8, said controller is further capable of:
  obtaining each of communication states measured under different conditions;
  specifying a communication state of poorest communication quality among the obtained communication states; and
  recording a distribution of delay times of the transmitted packets in the specified communication state in the delay time database.

14. The derivation device as set forth in claim 13,
  wherein the different conditions are times at which measurement is performed, and
  wherein said controller is further capable of specifying the poorest communication state, based on at least one of a R value, a packet loss rate, and a delay state indicating communication quality.

15. The derivation device as set forth in claim 8, further comprising:
  an evaluation result database recording a communication condition and an evaluation result of communication quality in association with each other, wherein
  said controller is further capable of:
    receiving an input of a communication condition; and
    extracting, from the evaluation result database, an evaluation result of communication quality associated with a communication condition identical or approximate to the received communication condition.

16. The derivation device as set forth in claim 15, wherein the communication condition is a characteristic of a device and a characteristic of a communication network used for communications.

17. A derivation device for deriving communication states of a plurality of packets which are to be transmitted successively at predetermined transmission timings, comprising:
  a delay time database recording a distribution of delay times at arrival of transmitted packets;
  means for reading the distribution of delay times recorded in said delay time database;
  means for transforming the read distribution of delay times;
  means for calculating packet transmission timings to which delay times are added, based on the transformed distribution of delay times and the predetermined transmission timings;
  means for determining whether or not a packet transmission order is changed by the calculated transmission timings to which delay times are added; and
  deriving means for deriving packet transmission timings adjusted so as not to cause a change in the transmission order when a determination is made that the packet transmission order is changed.

18. The derivation device as set forth in claim 17, wherein the read distribution of delay times is transformed so that the distribution of delay times based on transmission timings derived by said deriving means becomes identical to the distribution of delay times recorded in the delay time database.

19. The derivation device as set forth in claim 17, wherein said deriving means is constructed to adjust the transmission timings of packets whose transmission order based on the transmission timings to which delay times are added, is different from an original transmission order.

20. The derivation device as set forth in claim 17,
  wherein the delay time database records the delay times at arrival of transmitted packets and occurrence rates of the delay times in association with each other as a distribution of delay times, and
  wherein the read distribution of delay times is transformed by transforming the occurrence rates of delay times.

21. The derivation device as set forth in claim 17,
  wherein the delay time database records a loss rate at arrival of transmitted packets, and said derivation device further comprises:
    means for reading the loss rate recorded in the delay time database; and
    means for discarding a packet to be transmitted, based on the read loss rate.

22. The derivation device as set forth in claim 17, further comprising:
  means for obtaining each of communication states measured under different conditions;
  specifying means for specifying a communication state of poorest communication quality among the obtained communication states; and
  means for recording a distribution of delay times of the transmitted packets in the specified communication state in the delay time database.

23. The derivation device as set forth in claim 22,
  wherein the different conditions are times at which measurement is performed, and
  wherein said specifying means is constructed to specify the poorest communication state, based on at least one of a R value, a packet loss rate, and a delay state indicating communication quality.

24. The derivation device as set forth in claim 17, further comprising:
  an evaluation result database recording a communication condition and an evaluation result of communication quality in association with each other;
  means for receiving an input of a communication condition; and
  means for extracting, from the evaluation result database, an evaluation result of communication quality associated with a communication condition identical or approximate to the received communication condition.

25. The derivation device as set forth in claim 24, wherein the communication condition is a characteristic of a device and a characteristic of a communication network used for communications.

26. A non-transitory recording medium embodying a computer program for causing a computer to derive communication states of a plurality of packets which are to be transmitted successively at predetermined transmission timings, said computer program causing a computer to execute a method comprising:
  reading a distribution of delay times from a delay time database recording the distribution of delay times at arrival of transmitted packets;
  transforming the read distribution of delay times; and
  calculating packet transmission timings to which delay times are added, based on the transformed distribution of delay times and the predetermined transmission timings.

27. A non-transitory recording medium embodying a computer program for causing a computer to derive communication states of a plurality of packets which are to be transmitted successively at predetermined transmission timings, wherein said computer program causing a computer to execute a method comprising:

reading a distribution of delay times from a delay time database recording the distribution of delay times at arrival of transmitted packets;

transforming the read distribution of delay times;

calculating packet transmission timings to which delay times are added, based on the transformed distribution of delay times and the predetermined transmission timings;

determining whether or not a packet transmission order is changed by the calculated transmission timings to which delay times are added; and deriving packet transmission timings adjusted so as not to cause a change in the transmission order when a determination is made that the packet transmission order is changed.

28. The non-transitory recording medium as set forth in claim 27, wherein said method further comprises:

obtaining each of communication states measured under different conditions;

specifying a communication state of poorest communication quality among the obtained communication states; and recording a distribution of delay times of the transmitted packets in the specified communication state in the delay time database.

29. A communication quality evaluation method for evaluating communication quality of a plurality of packets which are to be transmitted by a communication device to other communication device successively at predetermined transmission timings, comprising:

accumulating transmitted multiple packets;

deriving transmission timings of a plurality of transmitted packets;

adjusting derived transmission timings to prevent a reversal of transmission timings;

calculating a delay time indicating a difference between an expected arrival time at the other communication device and an actual arrival time of a transmitted packet at the other communication device;

transforming a distribution of delay times calculated based upon derived transmission timings after the adjustment for preventing reversal of transmission timing, to match a distribution of delay times calculated based upon the derived transmission timings before the adjustment; and evaluating communication quality of packets through transmitting accumulated packets based on the derived transmission timings after the adjustment and outputting voice based on voice data contained in the transmitted accumulated packets.

* * * * *

UNITED STATES PATENT AND TRADEMARK OFFICE
CERTIFICATE OF CORRECTION

| | | |
|---|---|---|
| PATENT NO. | : 7,957,303 B2 | Page 1 of 1 |
| APPLICATION NO. | : 11/819743 | |
| DATED | : June 7, 2011 | |
| INVENTOR(S) | : Masanobu Morinaga et al. | |

It is certified that error appears in the above-identified patent and that said Letters Patent is hereby corrected as shown below:

Column 23, Line 28, In Claim 3, after "whether" insert --a--.

Signed and Sealed this
Sixteenth Day of August, 2011

David J. Kappos
*Director of the United States Patent and Trademark Office*